United States Patent
Ikeda

(10) Patent No.: US 11,580,919 B2
(45) Date of Patent: Feb. 14, 2023

(54) DRIVING METHOD OF DISPLAY DEVICE

(71) Applicant: Japan Display Inc., Tokyo (JP)

(72) Inventor: Masataka Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/657,225

(22) Filed: Mar. 30, 2022

(65) Prior Publication Data

US 2022/0319447 A1    Oct. 6, 2022

(30) Foreign Application Priority Data

Mar. 31, 2021    (JP) .............................. JP2021-061865

(51) Int. Cl.
*G09G 3/34*    (2006.01)
*G02F 1/167*    (2019.01)
*G02F 1/1685*    (2019.01)
*G02F 1/16766*    (2019.01)

(52) U.S. Cl.
CPC ............. *G09G 3/344* (2013.01); *G02F 1/167* (2013.01); *G02F 1/1685* (2019.01); *G02F 1/16766* (2019.01); *G09G 2310/08* (2013.01)

(58) Field of Classification Search
CPC .. G09G 3/344; G09G 2310/08; G02F 1/1685; G02F 1/16766; G02F 1/167
See application file for complete search history.

(56) References Cited

U.S. PATENT DOCUMENTS

| | | | |
|---|---|---|---|
| 2011/0216100 A1 | 9/2011 | Yamada | |
| 2020/0211479 A1* | 7/2020 | Ho | .......... G09G 3/344 |
| 2020/0335061 A1* | 10/2020 | An | .............. G09G 5/10 |
| 2021/0201810 A1* | 7/2021 | Feng | ..................... G09G 3/3233 |
| 2021/0335199 A1* | 10/2021 | Yuan | ..................... G09G 3/2092 |
| 2022/0238077 A1* | 7/2022 | Lin | .......... G02F 1/167 |

* cited by examiner

*Primary Examiner* — Ricardo Osorio

(74) *Attorney, Agent, or Firm* — Maier & Maier, PLLC

(57) ABSTRACT

The display device includes at least one pixel having a first capacitive element having a first terminal and a transistor connected to the first terminal and having a second terminal and a gate electrode. A driving method of the display device including in a first frame, a signal with a first pulse width is supplied to the gate electrode of the transistor, and a first voltage is written from the second terminal to the first terminal. In the second frame after the first frame, a signal with a second pulse width is supplied to the gate electrode, and the first terminal holds the first voltage. In the third frame after the second frame, a signal with a third pulse width is supplied to the gate electrode, and the second voltage is written from the second terminal to the first terminal.

9 Claims, 17 Drawing Sheets

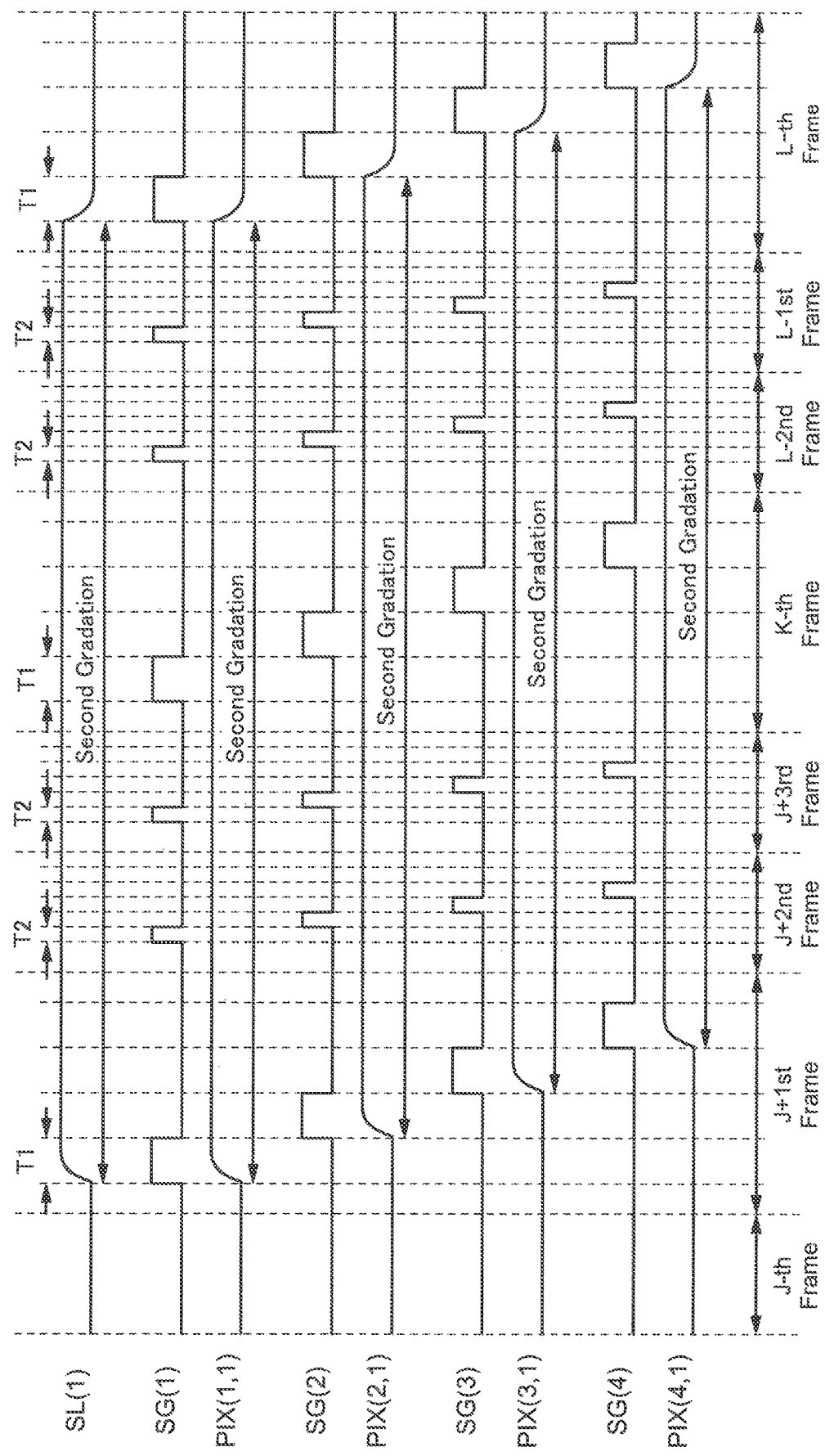

DRIVING METHOD OF DISPLAY DEVICE

CROSS-REFERENCE TO RELATED APPLICATIONS

This application is based upon and claims the benefit of priority from the prior Japanese Patent Application No. 2021-061865 filed on Mar. 31, 2021, the entire contents of which are incorporated herein by reference.

FIELD

An embodiment of the present invention relates to a driving method of a display device.

BACKGROUND

An electrophoresis display device is known as one example of a display device. An electrophoresis display device is called, for example, an electronic paper, and is widely used as a portable electronic book. An electrophoresis display device has a plurality of pixels. Each of the plurality of pixels includes, for example, a first electrode, a second electrode, an electrophoretic layer sandwiched between the first electrode and second electrode, a microcapsule included in the electrophoretic layer, and a switching element for supplying a voltage to one of the first electrode and the second electrode. When a voltage is applied to the first electrode and the second electrode of each of the plurality of pixels, particles in the microcapsule move between the first electrode and the second electrode. As a result, the electrophoresis display device can display images. Changing the time during which the voltage is applied to the first electrode and the second electrode of each of the plurality of pixels changes the distance that the microcapsule travels between the first electrode and the second electrode. Consequently, the electrophoresis display device can display so-called halftones (e.g., gray).

For example, when the switching element is unable to stably apply a voltage corresponding to halftones to one of either the first electrode or the second electrode, the electrophoresis display device displays uneven halftones. As a result, the display quality of the electrophoresis display device is impaired. For example, Japanese Laid Open Patent No. 2011-185989 discloses driving a driving method of an electrophoresis display device that reduce noises when displaying halftones and suppress deterioration of display quality.

SUMMARY

The display device includes at least one pixel having a first capacitive element having a first terminal and a transistor connected to the first terminal and having a second terminal and a gate electrode. A driving method of the display device including in a first frame, a signal with a first pulse width is supplied to a gate electrode of the transistor, and a first voltage is written from the second terminal to the first terminal. In a second frame after the first frame, a signal with a second pulse width is supplied to the gate electrode, and the first terminal holds the first voltage. In a third frame after the second frame, a signal with a third pulse width is supplied to the gate electrode, and the second voltage is written from the second terminal to the first terminal. The second pulse width is narrower than the first pulse width, the third pulse width is the same as the first pulse width, and the second voltage is smaller than the first voltage.

A driving method of a display device includes to supply a first voltage to a first terminal during which a signal of a first pulse width is supplied in a first frame, to hold the first voltage in first terminal during which a signal of a second pulse width different from the signal of the first pulse width is supplied in a second frame after the first frame, and to supply a second voltage to a first terminal during which a signal of the first pulse width and a signal of a third pulse width different from the signal of the second pulse width are supplied in a third frame after the second frame. The second pulse width being narrower than the first pulse width, the third pulse width being the same as the first pulse width, and the second voltage being smaller than the first voltage.

BRIEF DESCRIPTION OF DRAWINGS

FIG. 17 is a timing chart showing a driving method of an electrophoresis display device according to an embodiment of the present invention.

DESCRIPTION OF EMBODIMENTS

Embodiments of the present invention will be described below with reference to the drawings and the like. However, the present invention can be implemented in many different modes and should not be construed as being limited to the description of the following embodiments. For the sake of clarity of explanation, although the drawings may be schematically represented with respect to widths, thicknesses, shapes, configurations, and the like of the respective portions in comparison with actual embodiments, they are merely examples and do not limit the interpretation of the present invention. The letters "first" and "second" to each element are convenient labels used to distinguish each element and have no further meaning unless otherwise stated.

It is an object of the present invention to provide a driving method of an electrophoresis display device that suppresses deterioration of display quality.

A display device according to an embodiment of the present invention is, for example, an electrophoresis display device. In some embodiments described below, although an example is shown where the display device of the present invention is an electrophoresis display device, the display device of the present invention is not limited to an electrophoresis display device and may be a display device that displays images using time gradation. A display device according to an embodiment of the present invention writes a desired voltage to a pixel in a plurality of frames, for example, and displays one image. For example, in each frame, a plurality of gradations can be displayed by changing the writing time and changing the voltage to be written to the pixel.

1. First Embodiment

<1-1. Configuration of Electrophoresis Display Device 100>

Figure 1:
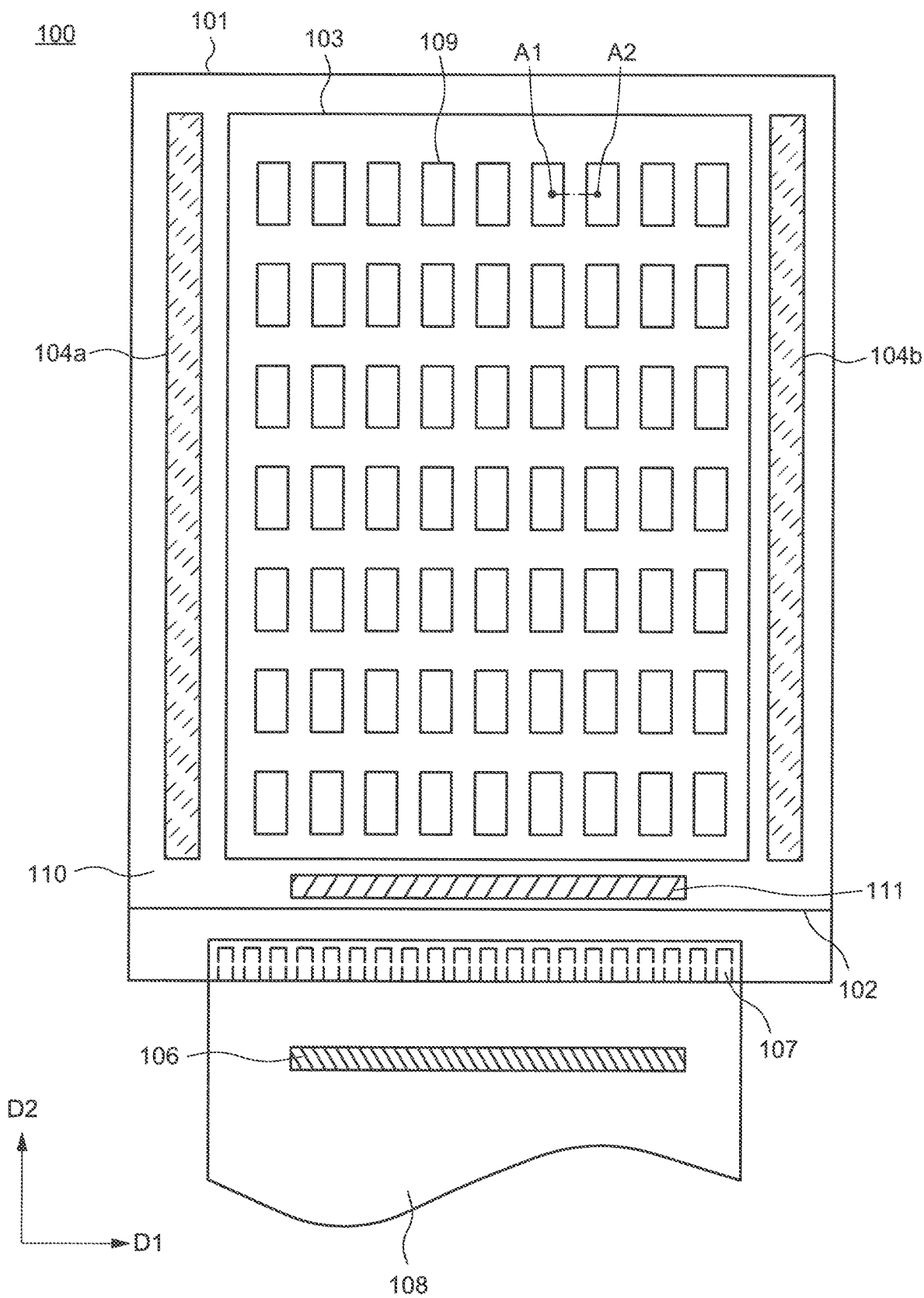
FIG. 1 is a plan view showing a configuration of an electrophoresis display device according to an embodiment of the present invention.
Figure 2:
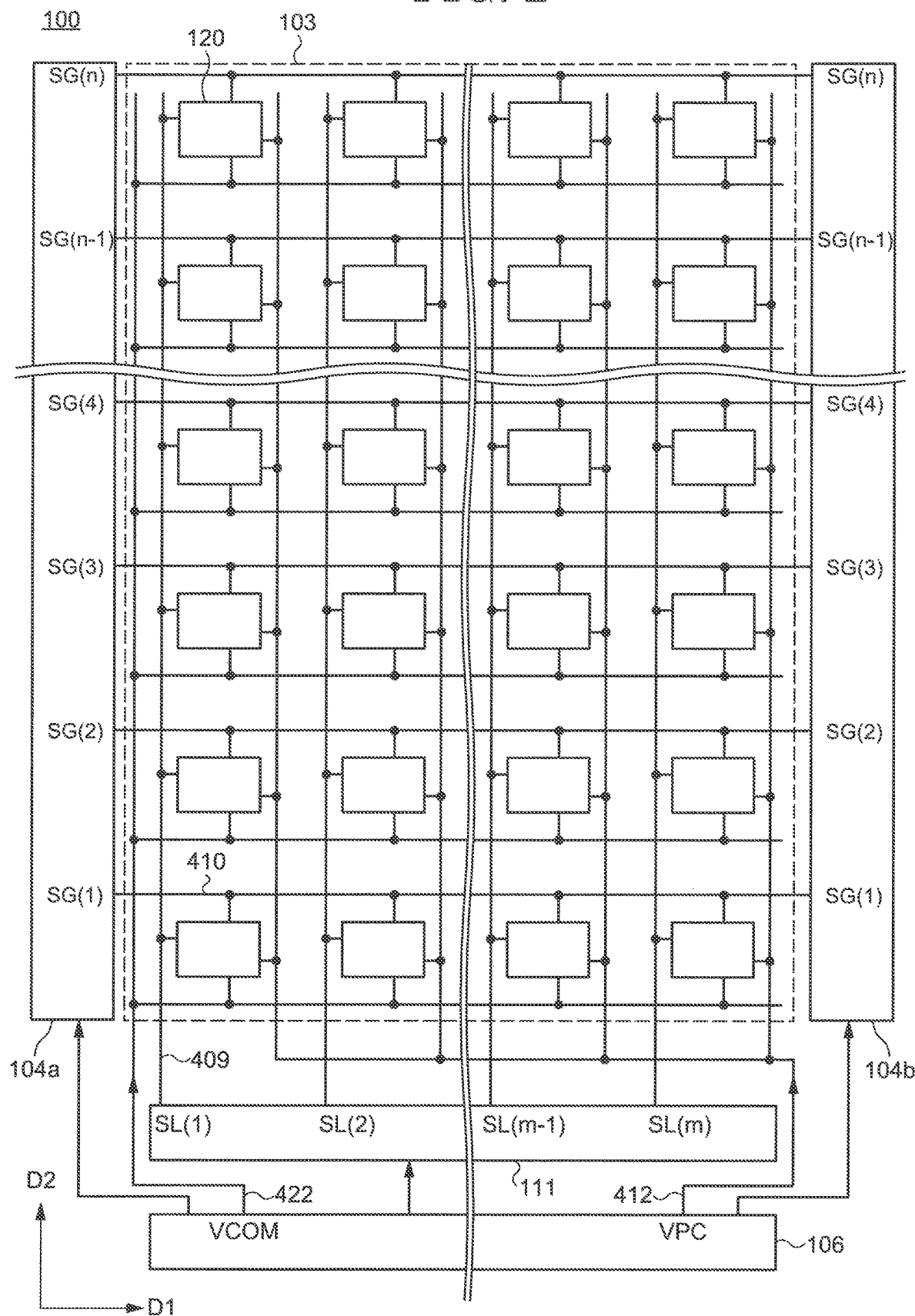
FIG. 2 is a plan view showing a configuration of an electrophoresis display device according to an embodiment of the present invention.

FIG. 1 and FIG. 2 are schematic plan views showing a configuration of an electrophoresis display device 100. The configuration of the electrophoresis display device 100 is not limited to the configuration shown in FIG. 1 and FIG. 2. Hereinafter, the electrophoresis display device 100 will be referred to as a display device 100.

As shown in FIG. 1, the display device 100 has a first substrate 101, a counter substrate 102, a display section 103, a scanning signal line drive circuit 104a, a scanning signal line drive circuit 104b, a driver IC 106, a terminal 107, a flexible printed board 108, and a video signal line drive circuit 111. The display device 100 is an active-matrix type display device.

In an embodiment of the present invention, for example, the direction D1 is referred to as a first direction D1 and direction D2 is referred to as a second direction D2. Direction is a direction indicated by an arrow in the figure, and a direction inverted by 180 degrees with respect to the direction indicated by the arrow is an opposite direction. In an embodiment, the direction from the first substrate 101 to the counter substrate 102 is upwards (or above) and the direction from the counter substrate 102 to the first substrate 101 is downwards (or below). For example, in the case of "a second member above a first member" and "a second member below a first member", the second member may be in contact with the first member and may be located away from the first member. In the latter case, a third member may be provided between the first member and the second member.

The first substrate 101 is formed in a rectangular shape. The counter substrate 102 is formed in a rectangular shape and is provided inside the first substrate 101. An outer shape of the counter substrate 102 is smaller than that of the first substrate 101. The first substrate 101 and the counter substrate 102 are arranged to face each other.

Figure 3:
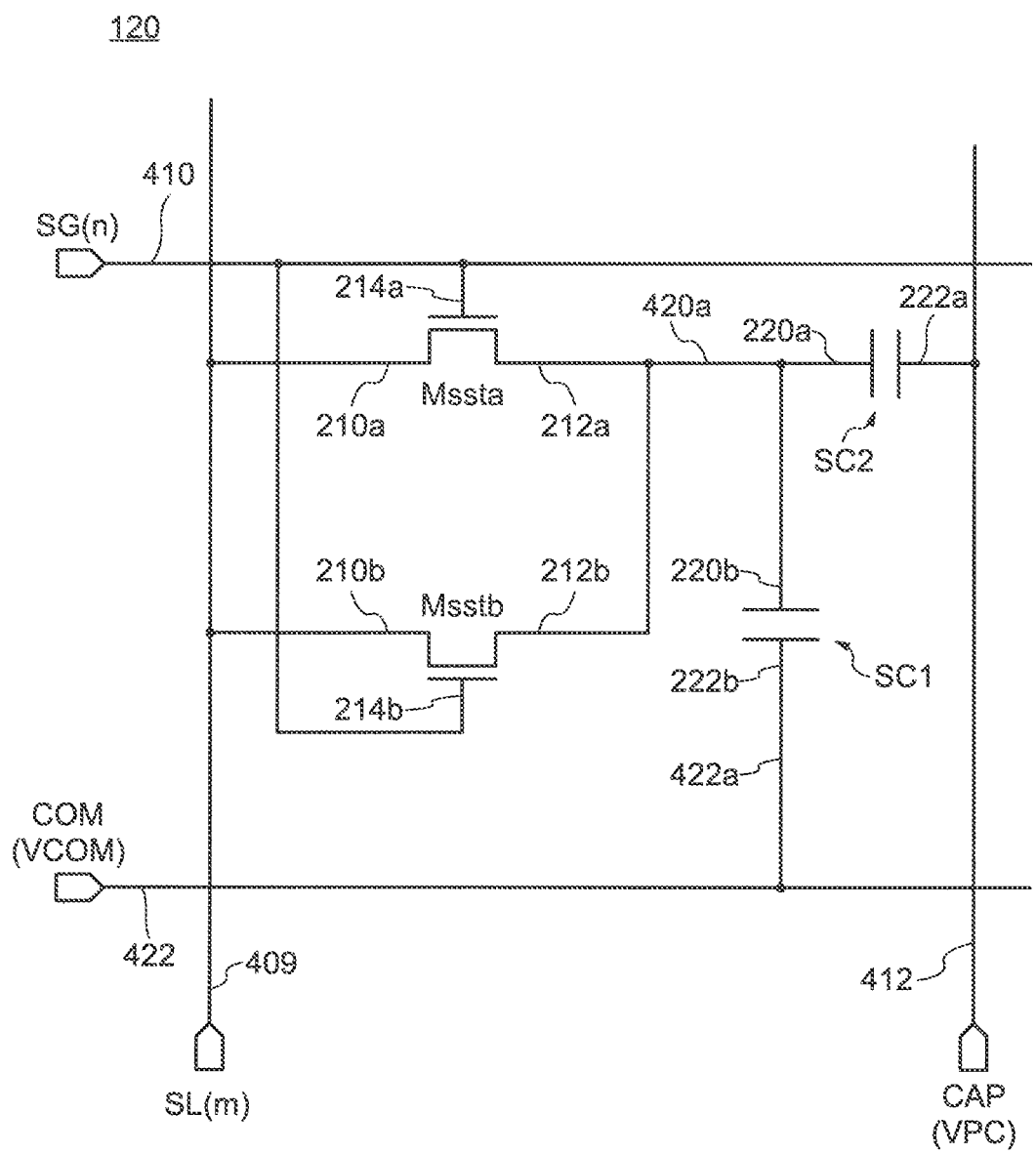
FIG. 3 is a circuit diagram showing a pixel circuit according to an embodiment of the present invention.

The display section 103 includes a plurality of pixels 109. The plurality of pixels 109 is arranged in a matrix in the direction D1 and the direction D2 intersecting the direction D1. Although details will be described later, each of the plurality of pixels 109 has a plurality of transistors constituting a pixel circuit 120 (FIG. 3), and a plurality of capacitive element (FIG. 3).

The flexible printed board 108 is electrically connected to a plurality of terminals 107. The flexible printed board 108 supplies a signal, voltage, power, and the like from an external circuit (not shown). The flexible printed board 108 supplies the supplied signal, voltage, power, and the like to the driver IC 106, the scanning signal line drive circuit 104a, the scanning signal line drive circuit 104b, the video signal line drive circuit 111, and the like.

An example is shown of the driver IC 106 being mounted on the flexible printed board 108. The driver IC 106 may be mounted on the first substrate 101. The driver IC 106 is electrically connected to, for example, the scanning signal line drive circuit 104a, the scanning signal line drive circuit 104b, the video signal line drive circuit 111, a capacitive wiring 412 (FIG. 2), a common potential line 422 (FIG. 2), and the display section 103 (FIG. 2). The driver IC 106 may provide a signal to the scanning signal line drive circuit 104a, the scanning signal line drive circuit 104b, the video signal line drive circuit 111, the display section 103, and the like via the flexible printed board 108, and the like.

The driver IC 106 has a logic circuit (not shown), a voltage generation circuit (not shown), and a drive timing control circuit (not shown). The driver IC 106 generates a signal or a power supply voltage using a logic circuit and a voltage generation circuit, and supplies the generated signal, power supply voltage, or power to the scanning signal line drive circuit 104a, the scanning signal line drive circuit 104b, the video signal line drive circuit 111, and the display section 103. The driver IC 106 generates a timing control signal required for signal processing of, for example, the scanning signal line drive circuit 104a, the scanning signal line drive circuit 104b, the video signal line drive circuit 111, and the display section 103, and supplies the generated timing control signal to the scanning signal line drive circuit 104a, the scanning signal line drive circuit 104b, the video signal line drive circuit 111, and the display section 103. The timing control signal is, for example, a clock signal and a start pulse for controlling row selection of the scanning signal line drive circuit 104a and the scanning signal line drive circuit 104b, and a clock signal and a start pulse for controlling column selection of the video signal line drive circuit 111, and the like.

In an embodiment of the present invention, the capacitive wiring 412 is also referred to as a CAP wiring and the common potential line 422 is also referred to as a COM potential line. A constant voltage VPC is supplied to the capacitive wiring 412 and a common voltage VCOM is supplied to the common potential line 422. In an embodiment of the present invention, although the constant voltage VPC supplied to the capacitive wiring 412 is the same or substantially the same voltage as the common voltage VCOM, the constant voltage VPC may be a voltage different from the common voltage VCOM.

As shown in FIG. 2, the scanning signal line drive circuit 104a and the scanning signal line drive circuit 104b are arranged, for example, at positions adjacent to the direction D1 with respect to the pixel 109 arranged in the direction D1. For example, a plurality of scanning signal lines 410 is connected to the scanning signal line drive circuit 104a and the scanning signal line drive circuit 104b. The scanning signal line drive circuit 104a and the scanning signal line drive circuit 104b commonly supply a selection signal SG (n) to each pixel circuit 120 of the plurality of pixels 109 located in the n-th row. Specifically, the scanning signal line drive circuit 104a and the scanning signal line drive circuit 104b generate the selection signal SG (n) using the timing control signal supplied from the driver IC 106. Each of the plurality of scanning signal lines 410 is connected to the pixel circuit 120 of the plurality of pixels 109 located in the n-th row in the display section 103. The selection signal SG (n) is supplied to each of a plurality of scanning lines 408. For example, the scan signal SG (1) is supplied to the first scanning line, the scan signal SG (2) is supplied to the second scanning line, the scan signal SG (3) is supplied to the third scanning line, the scan signal SG (4) is supplied to the fourth scanning line, the scan signal SG (n−1) is supplied to the n−1st scanning line, and the selection signal SG (n) is supplied to the n-th scanning line.

The video signal line drive circuit 111 is arranged, for example, at a position adjacent to the direction D2 with respect to the pixel 109 arranged in the direction D2. A plurality of video signal lines 409 is connected to the video signal line drive circuit 111, for example. The video signal line 409 is connected to the plurality of pixels 109 arranged in the same row. The video signal line drive circuit 111 supplies a video signal SL (m) (also referred to as Vsig (m)) to each pixel circuit 120 of the plurality of pixels 109 located in the m-th column using the timing control signal supplied from the driver IC 106. Each of the plurality of video signal lines 409 is connected to the pixel circuit 120 of the plurality of pixels 109 located in the m-th column in the display section 103. The video signal SL (m) is supplied to each of the plurality of video signal lines 409. For example, the video signal SL (1) is supplied to the first video signal line, the video signal SL (2) is supplied to the second video signal line, a gradation signal Vsig (m−2) is supplied to the m−2nd video signal line SL (m−2), the video signal SL (m−1) is supplied to the m−1st video signal line, and the video signal SL (m) is supplied to the m-th video signal line.

The driver IC 106 supplies the constant voltage VPC and the common voltage VCOM to each pixel circuit 120 of the pixel 109 included in the display section 103. Although not shown, the driver IC 106 supplies voltages and electric power required for driving the scanning signal line drive circuit 104a, the scanning signal line drive circuit 104b, the video signal line drive circuit 111, and the display section 103 to the scanning signal line drive circuit 104a, the scanning signal line drive circuit 104b, the video signal line drive circuit 111, and the display section 103. In an embodiment of the present invention, among the plurality of pixels 109, for example, m are arranged in the first direction D1, and n are arranged in the second direction D2. The numerical value m and the numerical value n are natural numbers, respectively. For example, the pixel 109 arranged in 3 rows 5 columns is referred to as the pixel 109 of 3 rows 5 columns or pixel 109 of coordinates (3, 5), and the like.

<1-2. Configuration of Pixel 109>

FIG. 3 is a circuit diagram showing the pixel circuit 120 according to an embodiment of the present invention. Each of the plurality of pixels 109 has a plurality of transistors constituting the pixel circuit 120, and a capacitive element. FIG. 3 shows components constituting the pixel circuit 120 of the pixel 109 of the n-row and m-column shown in FIG. 2. The configuration of the pixel circuit 120 shown in FIG. 3 is an example, and the configuration of the pixel circuit 120 is not limited to the configuration shown in FIG. 3. The same or similar configurations as those in FIG. 1 and FIG. 2 will not be described here.

As shown in FIG. 3, the pixel circuit 120 of the pixel 109 includes a first selecting transistor Mssta, a second selecting transistor Msstb, a first capacitor SC1, and a second capacitor SC2. The first selecting transistor Mssta and the second selecting transistor Msstb are composed of the same conductivity type, for example, a P-channel type thin film transistor (TFT). In an embodiment of the present invention, each semiconductor layer of the first selecting transistor Mssta and the second selecting transistor Msstb is formed of an oxide semiconductor. The semiconductor layer may utilize a semiconductor other than an oxide semiconductor, such as a low-temperature polycrystalline silicon, and amorphous silicon, or the like. The first selecting transistor Mssta and the second selecting transistor Msstb may be constituted by an N-channel type TFT.

The first selecting transistor Mssta and the second selecting transistor Msstb have a first terminal 210, a second terminal 212, and a control terminal 214, respectively. In an embodiment of the present invention, the control terminal 214 functions as a gate electrode, one of the first terminal 210 and the second terminal 212 functions as a source electrode, and the other of the first terminal 210 and the second terminal 212 functions as a drain electrode. The first selecting transistor Mssta and the second selecting transistor Msstb are electrically connected in parallel between the video signal line 409 and a pixel electrode 420a. In the first selecting transistor Mssta and the second selecting transistor Msstb, the function as a source and the function as a drain of each electrode may be replaced depending on the voltage supplied to the source electrode and drain electrode.

In the first selecting transistor Mssta, a first terminal 210a is connected to the video signal line 409, a second terminal 212a is connected to the pixel electrode 420a, and a control terminal 214a is connected to the scanning signal line 410. In the second selecting transistor Msstb, a first terminal 210b is connected to the video signal line 409, a second terminal 212b is connected to the pixel electrode 420a, and a control terminal 214b is connected to the scanning signal line 410. The selection signal SG (n) is supplied to the scanning signal line 410. The video signal SL (m) is supplied to the video signal line 409. As a result, the control terminal 214a and the control terminal 214b are supplied with the selection signal SG (n) from the scanning signal line 410, and the first terminal 210a and the first terminal 210b are supplied with the video signal SL (m) from the video signal line 409. Each of the first selecting transistor Mssta and the second selecting transistor Msstb is switched to a conductive state or non-conductive state by the selection signal SG (n). The video signal SL (m) is supplied to the pixel electrode 420a via the video signal line 409, and the conductive first selecting transistor Mssta, and the second selecting transistor Msstb, respectively.

In an embodiment of the present invention, for example, it is assumed that the conduction state is the state in which the source electrode and drain electrode of the transistor is conductive and the transistor is turned on (ON). In an embodiment of the present invention, for example, it is assumed that the non-conductive state is the state in which the source electrode and drain electrode of the transistor are non-conductive and the transistor is turned off (OFF). In each transistor, the source electrode and drain electrode may be replaced depending on the voltage of each electrode. It will be readily understood by those skilled in the art that even when the transistor is in the off state, a slight current flows, such as a leakage current.

The first capacitor SC1 and the second capacitor SC2 are capacitive elements. A first terminal 220b of the first capacitor SC1 is connected to the pixel electrode 420a, and a second terminal 222b of the first capacitor SC1 is connected to a common electrode 422*a*. The first terminal 220*a* of the second capacitor SC2 is connected to the pixel electrode 420*a*, and the second terminal 222*a* of the second capacitor SC2 is connected to the capacitive wiring 412. The common electrode 422*a* is connected to the common potential line 422. The common electrode 422*a* is provided on the counter substrate 102, for example, and may be referred to as a counter electrode. The common electrode 422*a* is shared by all the pixels 109 and may be referred to as a common electrode.

The first selecting transistor Mssta and the second selecting transistor Msstb control whether a voltage supplied to the video signal SL (m) is supplied to the pixel electrode 420*a* based on the selection signal SG (n).

Figure 4:
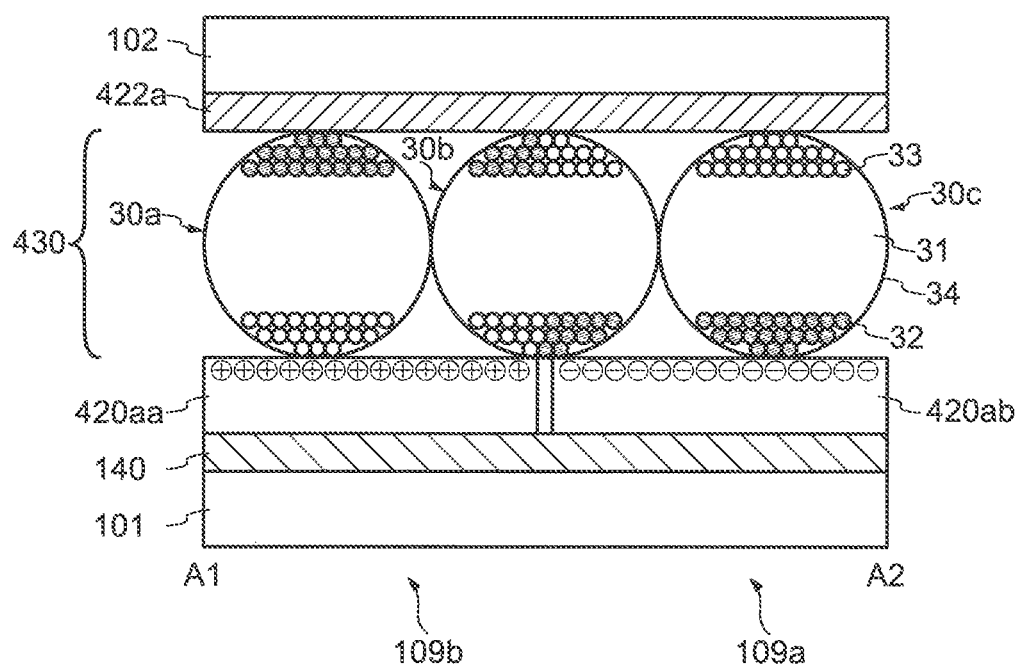
FIG. 4 shows an end-face structure of a cross-section part along a line A1-A2 shown in FIG. 1.

The first capacitor SC1 has a function of controlling a display function layer 430 sandwiched between the first terminal 220*b* and the pixel electrode 420*a* and the common electrode 422*a* (FIG. 4). As will be described in detail later, by applying a voltage to the first terminal 220*b* and the pixel electrode 420*a*, the particles in the microcapsule 30 (FIG. 4) contained in the display function layer 430 move. As a result, the display device 100 can display images. The first capacitor SC1 also has a function of holding charges corresponding to the voltage supplied to the first terminal 220*b* and the pixel electrode 420*a*. That is, in the display device 100, by using the first capacitor SC1, the charge corresponding to the voltage supplied to the video signal SL (m) is held in the first capacitor SC1 so that it is possible to suppress the degradation of the gradation displayed by the pixel 109.

The second capacitor SC2 has a function of holding charges corresponding to the voltage supplied to the first terminal 220*a* and the pixel electrode 420*a*. Since the voltage supplied to the first terminal 220*a* and the pixel electrode 420*a* is the same as or substantially the same as the voltage supplied to the video signal SL (m), the pixel 109 displays the gradation corresponding to the voltage supplied to the first terminal 220*a* and the pixel electrode 420*a*. That is, by using the second capacitor SC2, it is possible to hold the charge corresponding to the voltage supplied to the video signal SL (m) so that it is possible to suppress the degradation of the gradation displayed by the pixel 109. Similar to the first capacitor SC1, the second capacitor SC2 also has a function of holding charges corresponding to voltages supplied to the first terminal 220*a* and the pixel electrode 420*a*. That is, in the display device 100, by using the second capacitor SC2, the charge corresponding to the voltage supplied to the video signal SL (m) is held in the second capacitor SC2 so that it is possible to suppress the degradation of the gradation displayed by the pixel 109.

<1-3. Examples of End-Surface of Cross-Section Part of Display Device 100>

FIG. 4 is an outline of an end-surface structure of a cross-section part along the line A1-A2 shown in FIG. 1 of the display device 100 according to an embodiment of the present invention. The end-surface structure of the cross-section part shown in FIG. 4 schematically shows the boundary between a first pixel 109*a* and a second pixel 109*b*. The end-surface structure of the cross-section part of the display device 100 according to an embodiment of the present invention shown in FIG. 4 is an example, and the end-surface structure of the cross-section part of the display device 100 according to the embodiment of the present invention is not limited to the configuration shown in FIG. 4. The same or similar configurations as those of FIG. 1 to FIG. 3 will not be described here.

As shown in FIG. 4, a base layer 140 is provided on the first substrate 101. A pixel electrode 420*aa* of the first pixel 109*a* and a pixel electrode 420*ab* of the second pixel 109*b* are provided on the base layer 140. The common electrode 422*a* is provided on the counter substrate 102. The surface of the counter substrate 102 on which the common electrode 422*a* is provided faces the pixel electrode 420*aa* and the pixel electrode 420*ab*. The common electrode 422*a* is formed of, for example, a transparent conductive material such as an indium tin oxide (ITO) or indium zinc oxide (IZO).

In an embodiment of the present invention, the first substrate 101 and the counter substrate 102 are formed of an insulating material such as resin and glass. The counter substrate 102 has light transmission properties. The counter substrate 102 is provided on the screen-side (observing side). The first substrate 101 is provided on the other side of the screen and may be opaque or transparent.

The display function layer 430 provided in the display section 103 is provided between the pixel electrode 420*aa* and the pixel electrode 420*ab* and the common electrode 422*a*. The display device 100 according to an embodiment of the present invention is an electrophoresis display device, and the display function layer 430 is an electrophoresis layer. The display function layer 430 includes a plurality of microcapsules 30*a*, 30*b*, 30*c*. In the display function layer 430, the plurality of microcapsules 30 is generally arranged without gaps in a plane or substantially in a plane of the first direction D1 and the second direction D2

An adhesive layer (not shown) is provided between the pixel electrodes 420*aa*, 420*ab* and the display function layer 430. The pixel electrodes 420*aa*, 420*ab* are in contact with the adhesive layer. An insulating protective layer may be provided between the pixel electrodes 420*aa*, 420*ab* and the adhesive layer. The display device 100 according to an embodiment of the present invention can protect the pixel electrode 420*a* by providing an insulating protective layer.

The microcapsule 30 is a spherical body having a particle diameter of, for example, 20 μm or more and 70 μm or less. In FIG. 4, for convenience of explanation, an example is shown in which three microcapsules 30 are arranged between the pixel electrode 420*aa* and the pixel electrode 420*ab* and the common electrode 422*a*. For example, when the pixel 109 has a rectangular shape or a polygonal shape and the length of one side of the pixel 109 is 100 μm to several hundreds μm, about one to ten microcapsules 30 are arranged on the pixel electrode 420 of the pixel 109.

The microcapsule 30 includes a dispersion medium 31, a plurality of black particles 32, and a plurality of white particles 33. The black particles 32 and the white particles 33 are also referred to as electrophoretic particles. An outer shell section (wall film) 34 of the microcapsule 30 is formed using, for example, a transparent resin such as acrylic resin. The dispersion medium 31 is a liquid for dispersing the black particles 32 and the white particles 33 in the microcapsule 30. The black particles 32 are, for example, particles (polymer or colloid) made of a black pigment such as aniline black, and are positively charged, for example. The white particles 33 are, for example, particles (polymer or colloid) made of a white pigment such as titanium dioxide, and are negatively charged, for example. Additive agents may be added to the pigments as needed. Instead of the black particles 32 and the white particles 33, pigments such as red, green, blue, yellow, cyan, magenta, and the like may be used, for example.

In the display function layer 430 having the above configuration, when the second pixel 109*b* displays black, the voltage supplied to the pixel electrode 420*aa* is larger than the voltage supplied to the common electrode 422*a*. That is, when the potential of the common electrode 422*a* is used as the reference potential, a positive voltage is supplied to the pixel electrode 420*aa*, and the pixel electrode 420*aa* holds charges corresponding to the positive voltage. As a result, the positively charged black particles 32 move to the common electrode 422*a*, and the negatively charged white particles 33 move to the pixel electrode 420*aa*. That is, the second pixel 109*b* displays black. Therefore, when the second pixel 109*b* is observed from the common electrode 422*a* side, black is visually recognized.

On the other hand, in the display function layer 430 having the above configuration, when the first pixel displays white, the voltage supplied to the pixel electrode 420*ab* is smaller than the voltage supplied to the common electrode 422*a*. That is, when the potential of the common electrode 422*a* is used as the reference potential, a negative voltage is supplied to the pixel electrode 420*ab*, and the pixel electrode 420*ab* holds charges corresponding to the negative voltage. As a result, the negatively charged white particles 33 move to the common electrode 422*a*, and the positively charged black particles 32 move to the pixel electrode 420*ab*. That is, the first pixel 109*a* displays white. Therefore, when the first pixel 109*a* is observed from the common electrode 422*a* side, white is visually recognized.

In the display function layer 430 having the above configuration, the first pixel 109*a* can display the gradation between black and white (halftones, for example, gray) by changing the pulse width of the selection signal SG (n) supplied to the scanning signal line 410 or changing the level (voltage) of the video signal SL (m) supplied to the video signal line 409. That is, in the display device 100, the gradation displayed by the first pixel 109*a* can be changed according to the time when the control terminal 214*a* of the first selecting transistor Mssta and the control terminal 214*b* of the second selecting transistor Msstb are conductive, and the voltages supplied to the first terminal 210*a* of the first selecting transistor Mssta and the first terminal 210*b* of the second selecting transistor Msstb.

<1-4. Driving Method of Display Device 100>

Figure 5:
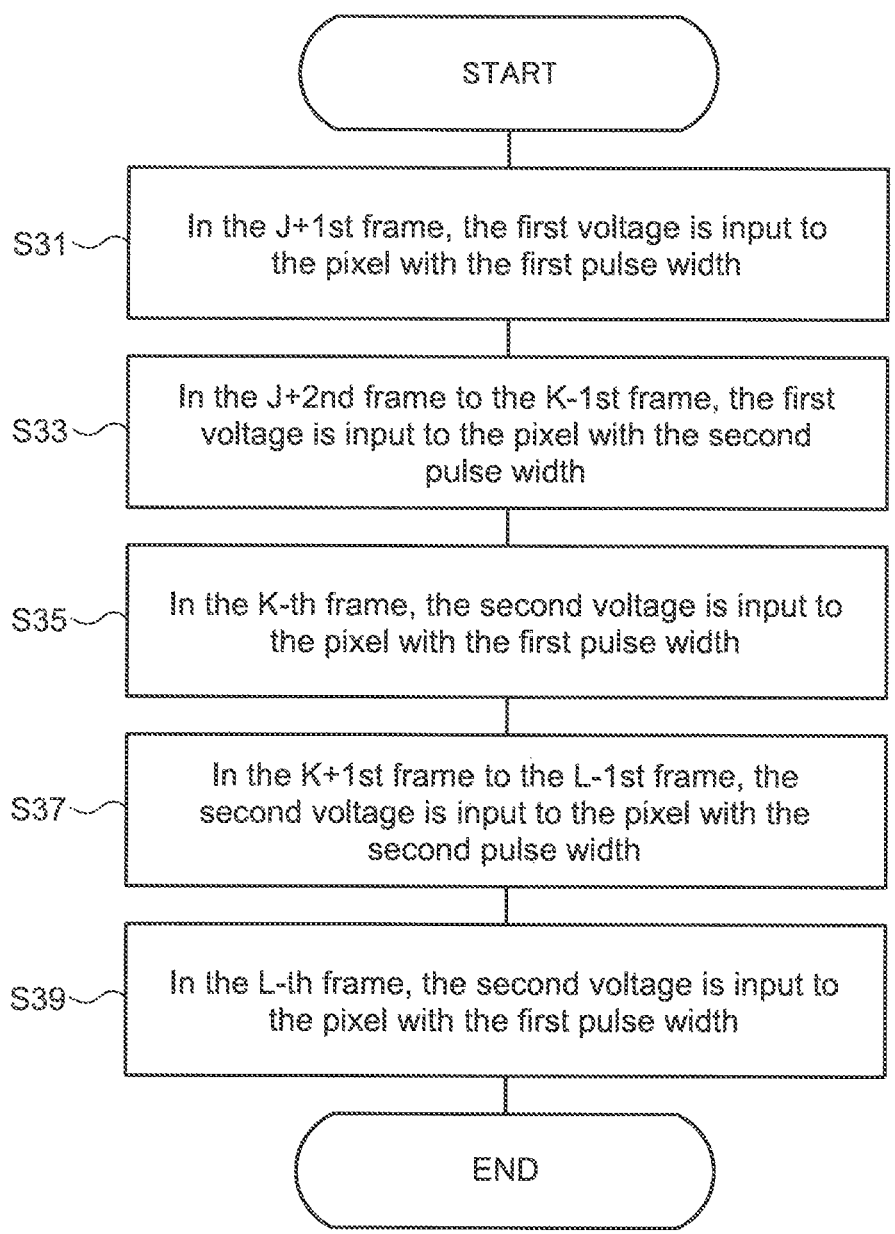
FIG. 5 is a flowchart showing a driving method of an electrophoresis display device according to an embodiment of the present invention.
Figure 6:
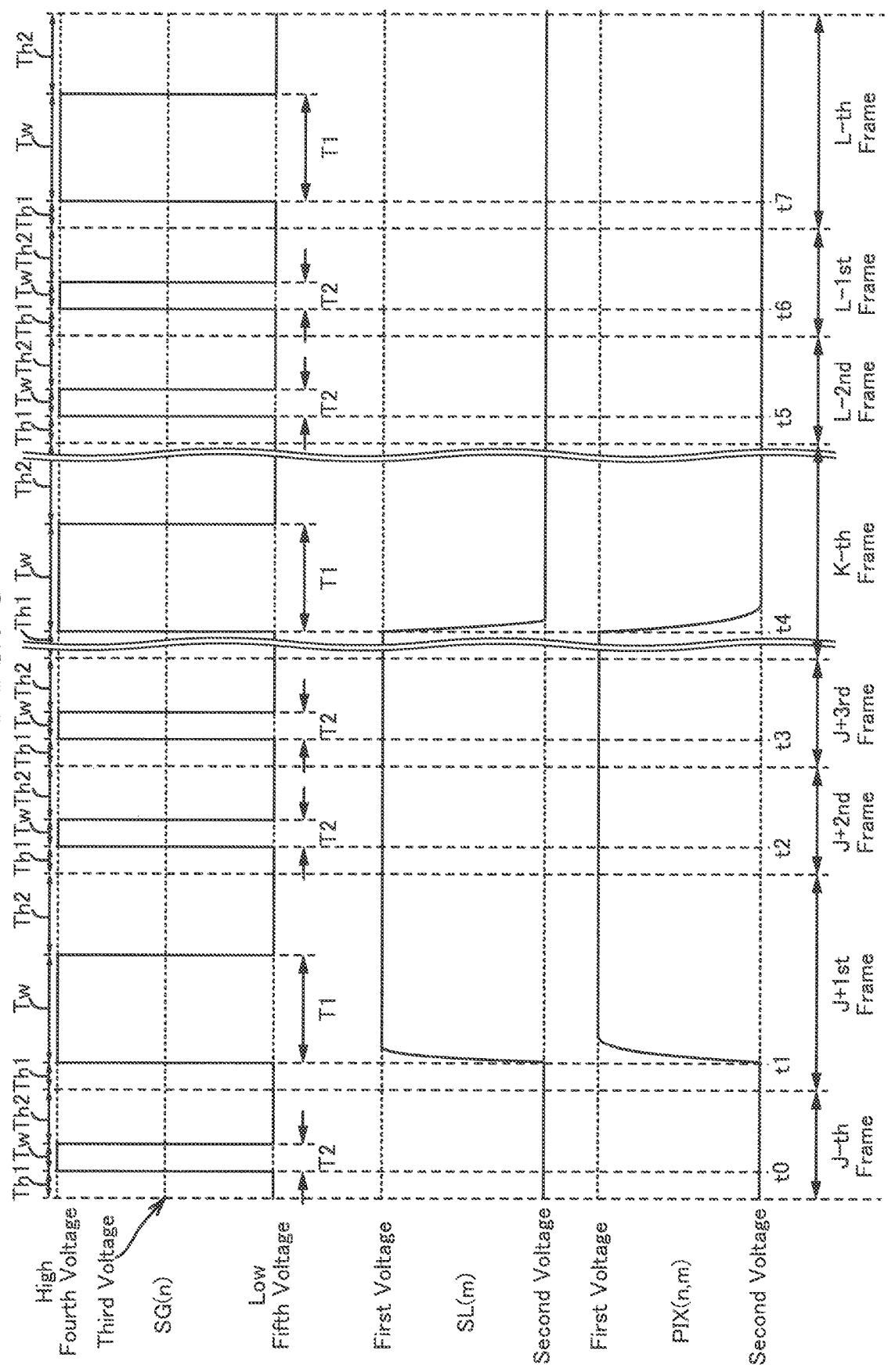
FIG. 6 is a timing chart showing a driving method of an electrophoresis display device according to an embodiment of the present invention.
Figure 7:
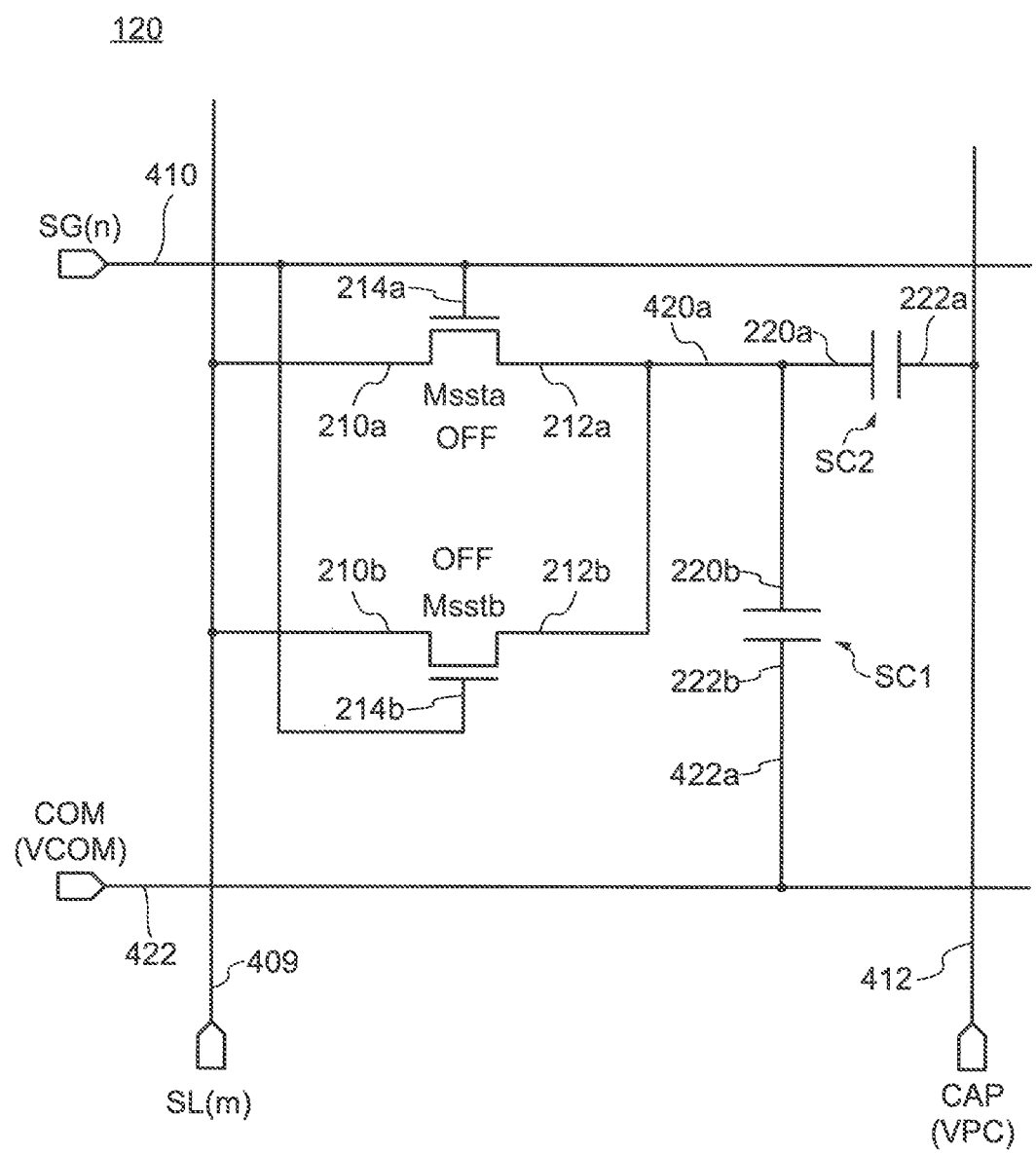
FIG. 7 is a schematic diagram showing an operation status of a pixel in the timing chart shown in FIG. 6.

FIG. 5 is a flowchart showing a driving method of the display device 100. FIG. 6 is a timing chart showing a driving method of the display device 100. FIG. 7 to FIG. 12 are schematic diagrams showing an operation status of the pixel 109 of the display device 100. The driving method shown in FIG. 5 to FIG. 12 is an example of the driving method of the display device 100, and the driving method of the display device 100 is not limited to the driving method shown in FIG. 5 to FIG. 12. The same or similar configurations as those of FIG. 1 to FIG. 4 will not be described here.

In an embodiment of the present invention, a driving method of the display device 100 for driving the plurality of pixels 109 electrically connected to the scanning signal line 410 in the n-th row is explained. As shown in FIG. 6, there is a plurality of frames (frame, F) in the driving method of the display device 100. The plurality of frames is, for example, L frames. The plurality of frames includes a J-th frame, a J+1st frame, a J+2nd frame, a J+3rd frame, . . . , a K-th frame, . . . , an L−2nd frame, an L−1st frame, and an L-th frame. Each frame includes a first holding period (Th1), a writing period (Tw), and a second holding period (Th2). The numerical value J, the numerical value K, and the numerical value L are positive natural numbers, respectively, the numerical value L is larger than the numerical value K, and the numerical value K is larger than the numerical value J. In an embodiment of the present invention, a frame may be referred to as a frame period. FIG. 6 shows a timing chart for driving the plurality of pixels 109 electrically connected to the scanning signal line 410 in the n-th row as an example. Specifically, FIG. 6 is a timing chart in which a signal (voltage) of the first gradation (write) is input to the pixel 109 of the n-th row and m-th column, and the pixel 109 of the n-th row and m-th column displays the first gradation. FIG. 7 to FIG. 13 show operation statuses of the pixel 109 of the n-th row and m-th column. The display device 100 writes a signal (voltage) of the gradation corresponding to each pixel to the plurality of pixels 109 of the first row to the last row (n-th row) based on the flowchart of the driving method shown in FIG. 5, and the display device 100 can display the images.

First, the J-th frame is driven in the display device 100. The driving method in the J-th frame will be described with reference to FIG. 5, FIG. 6, and FIG. 7. When the display device 100 is driven, the common voltage VCOM is supplied to the common potential line 422 and the constant voltage VPC is supplied to the capacitive wiring 412. In the subsequent driving method, the common voltage VCOM is continuously supplied to the common potential line 422 and the constant voltage VPC is continuously supplied to the capacitive wiring 412. In an embodiment of the present invention, the capacitive wiring 412 may be referred to as a constant potential line or a constant voltage line.

As shown in FIG. 6, in the first holding period of the J-th frame (Th1), a low level is supplied to the selection signal SG (n), and the video signal SL (m), which is a second voltage, is supplied to the video signal line 409. For example, the second voltage is held as the voltage of the pixel electrode 420*a* of the pixel 109 of the n-th row and m-th column. When the low level is supplied to the selection signal SG (n), the first selecting transistor Mssta and the second selecting transistor Msstb are in a non-conductive state.

Subsequently, in the writing period of the J-th frame (Tw), at time t0, the selection signal SG (n) is changed from a low level to a high level and the high level is supplied to the selection signal SG (n). The video signal SL (m) which is the second voltage is supplied to the video signal line 409. When the high level is supplied to the selection signal SG (n), the first selecting transistor signal Mssta and the second selecting transistor signal Msstb change from the non-conductive state to the conductive state, and the second voltage is supplied from the video signal line 409 to the pixel electrode 420*a* (the first terminal 220*b* of the first capacitor SC1 and the first terminal 220*a* of the second capacitor SC2) of the pixel 109 of the n-th row and m-th column. When the time T2 elapses, that is, at the time t0+T2, the selection signal SG (n) changes from the high level to the low level. The low level is supplied to the selection signal SG (n). The second voltage is still supplied to the video signal line 409. When the low level is supplied to the selection signal SG (n), the first selecting transistor signal Mssta and the second selecting transistor signal Msstb change from the conductive state to the non-conductive state, and the supply of the second voltage from the video signal line 409 to the pixel electrode 420*a* (the first terminal 220*b* of the first capacitor SC1 and the first terminal 220*a* of the second capacitor SC2) of the pixel 109 of the n-th row and m-th column is stopped. Since the pixel 109 includes the first capacitor SC1 and the second capacitor SC2, the pixel electrode 420*a* (the first terminal 220*b* of the first capacitor SC1 and the first terminal 220*a* of the second capacitor SC2) can hold the second voltage.

Subsequently, in the second holding period (Th2) of the J-th frame, from the time t0+T2 until the end of the J-th frame, a low level is supplied to the selection signal SG (n), the video signal SL (m) supplied with the second voltage is supplied to the video signal line 409, and the pixel electrode 420*a* (the first terminal 220*b* of the first capacitor SC1 and the first terminal 220*a* of the second capacitor SC2) holds the second voltage. In an embodiment of the present invention, the J-th frame is, for example, the first frame for displaying images on the display device 100 and is an initialization period or a resetting period. In an embodiment of the present invention, the second voltage is greater than the voltage of the low level and smaller than the voltage of the high level, the common voltage VCOM, and the constant voltage VPC.

Figure 8:
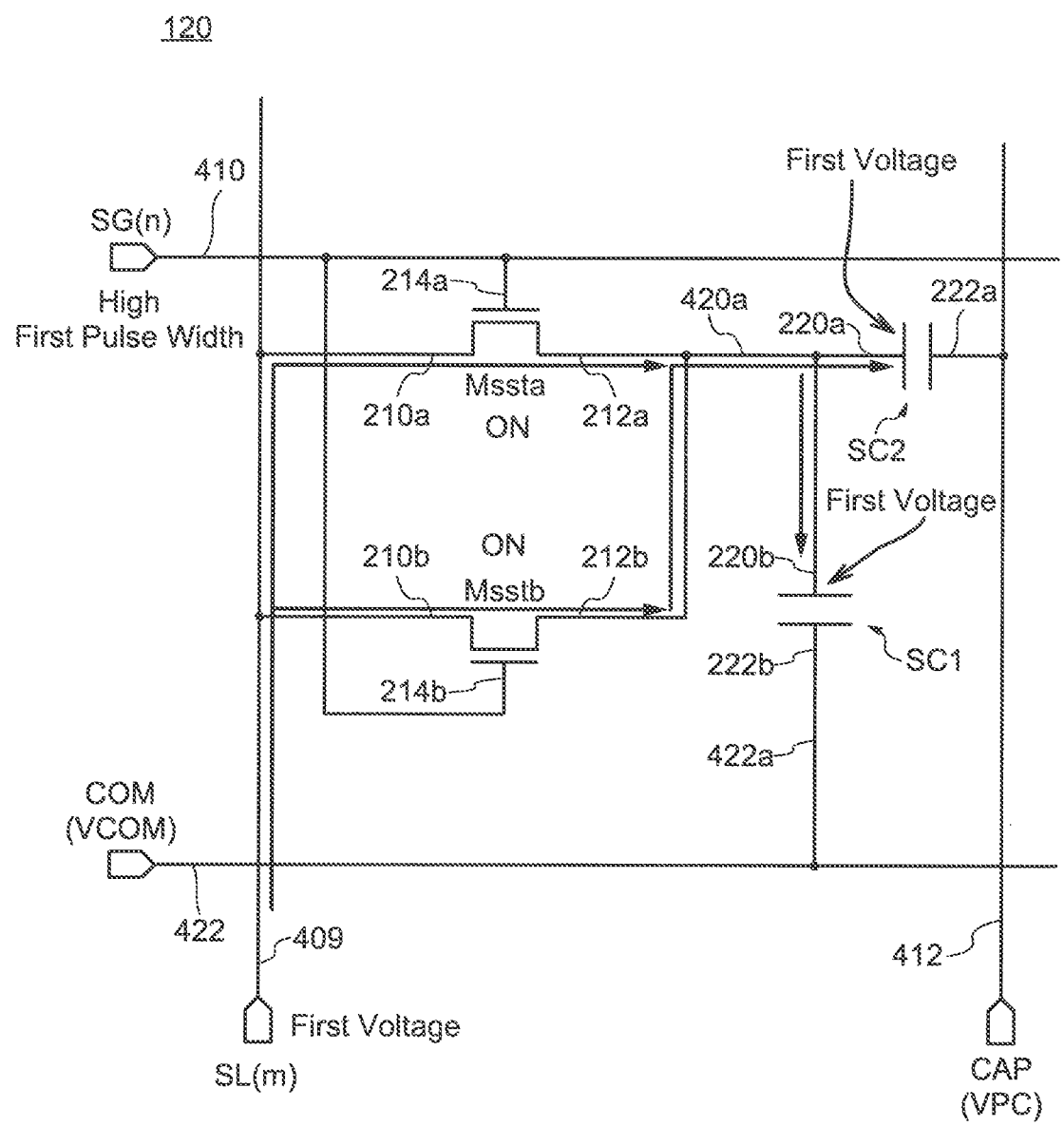
FIG. 8 is a schematic diagram showing an operation status of a pixel in the timing chart shown in FIG. 6.

Next, a driving method in the J+1st frame will be described. As shown in FIG. 5, in step 31 (S31), in the J+1st frame, the first voltage is input to the pixel at the first pulse width (pulse width of time T1). As shown in FIG. 5, FIG. 6, and FIG. 8, in the first holding period (Th1) of the J+1st frame, the low level is supplied to the selection signal SG (n) after the second holding period (Th2) of the J-th frame, the video signal SL (m) supplied with the second voltage is supplied to the video signal line 409, and the pixel electrode 420*a* of the pixel 109 of the n-th row and m-th column holds the second voltage. Therefore, the first selecting transistor Mssta and the second selecting transistor Msstb remain in the non-conductive state.

Subsequently, in the writing period (Tw) of the J+1st frame, at time t1, the selection signal SG (n) is changed from a low level to a high level and the high level is supplied to the selection signal SG (n). The video signal line 409 changes from the second voltage to the first voltage and the first voltage is supplied to the video signal line 409. When the high level is supplied to the selection signal SG (n), the first selecting transistor signal Mssta and the second selecting transistor signal Msstb change from the non-conductive state to the conductive state, and the first voltage is supplied from the video signal line 409 to the pixel electrode 420*a* (the first terminal 220*b* of the first capacitor SC1 and the first terminal 220*a* of the second capacitor SC2) of the pixel 109 of the n-th row and m-th column.

The first voltage is greater than the second voltage, the voltage of the low level, the common voltage VCOM, and the constant voltage VPC, and is smaller than the voltage of the high level. Threshold voltages of the first selecting transistor Mssta and the second selecting transistor Msstb are smaller than a difference between a high level (high-level voltage) supplied to the selection signal SG (n) and the first voltage. As a result, the first selecting transistor Mssta and the second selecting transistor Msstb can sufficiently supply the first voltage from the video signal line 409 to the pixel electrode 420*a* (the first terminal 220*b* of the first capacitor SC1 and the first terminal 220*a* of the second capacitor SC2) of the pixel 109 of the n-th row and m-th column. In other words, the first selecting transistor Mssta and the second selecting transistor Msstb can supply the first voltage without a voltage drop or the first voltage with a suppressed voltage drop to the pixel electrode 420*a* (the first terminal 220*b* of the first capacitor SC1, the first terminal 220*a* of the second capacitor SC2) of the pixel 109 of the n-th row and m-th column. In the case where the polarity of the first voltage is inverted and the first voltage is smaller than the second voltage, the first voltage may be smaller than the voltage of the low level, the common voltage VCOM and the constant voltage VPC, and the voltage of the high level.

Figure 9:
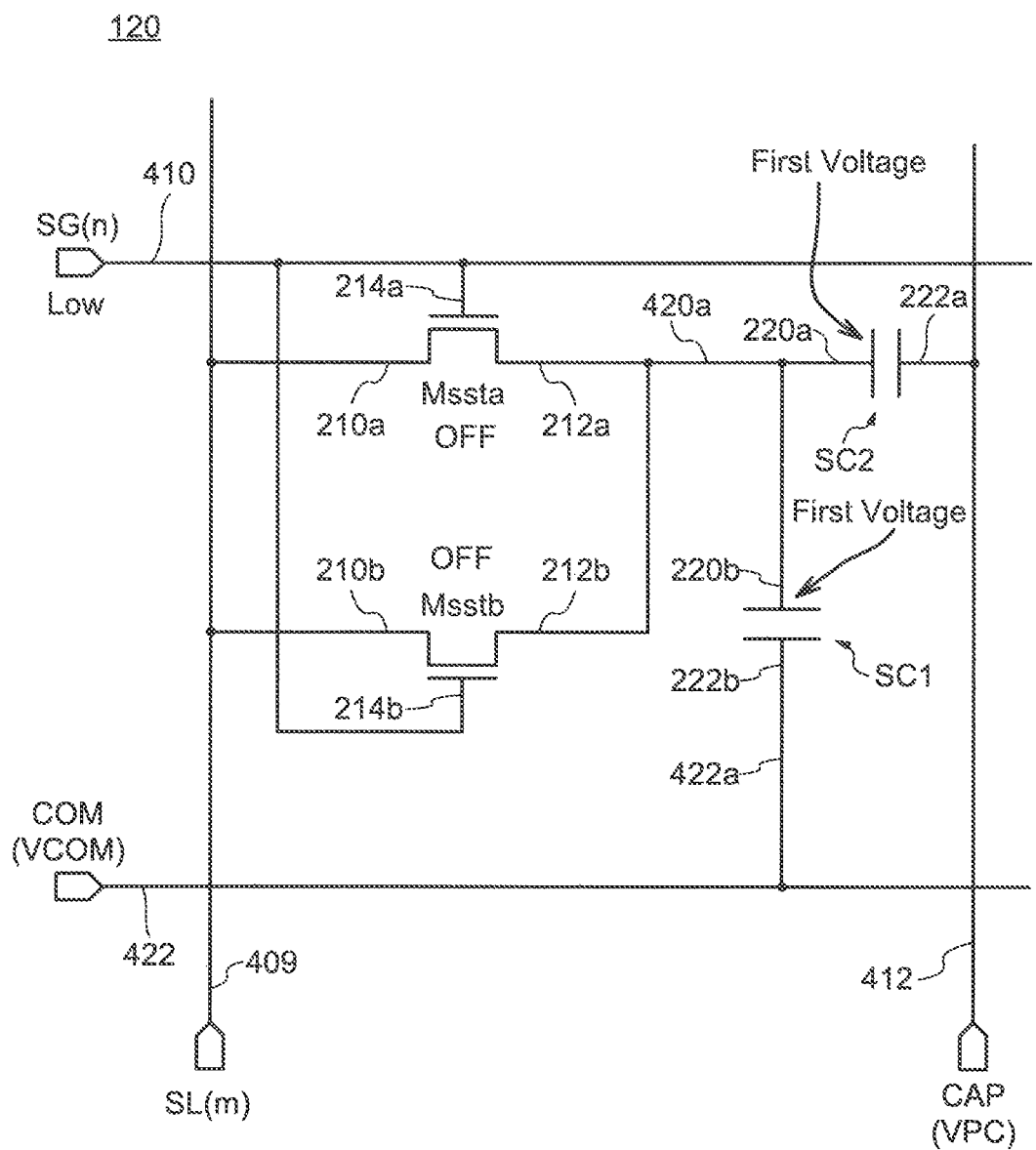
FIG. 9 is a schematic diagram showing an operation status of a pixel in the timing chart shown in FIG. 6.

As shown in FIG. 6 and FIG. 9, at time t1+T1 when time T1 has elapsed, the selection signal SG (n) changes from a high level to a low level. The low level is supplied to the selection signal SG (n). The first voltage is still supplied to the video signal line 409. When the low level is supplied to the selection signal SG (n), the first selecting transistor signal Mssta and the second selecting transistor signal Msstb change from the conductive state to the non-conductive state, and the supply of the first voltage from the video signal line 409 to the pixel electrode 420*a* (the first terminal 220*b* of the first capacitor SC1 and the first terminal 220*a* of the second capacitor SC2) of the pixel 109 of the n-th row and m-th column is stopped. Since the pixel 109 includes the first capacitor SC1 and the second capacitor SC2, the pixel electrode 420*a* (the first terminal 220*b* of the first capacitor SC1 and the first terminal 220*a* of 24econdd capacitor SC2) can hold the first voltage.

Subsequently, as shown in FIG. 6 and FIG. 9, in the second holding period (Th2) of the J+1$^{st}$ frame, from the time t1+T1 until the end of the J+1$^{st}$ frame, the low level is supplied to the selection signal SG (n), the video signal SL (m) supplied with the first voltage is supplied to the video signal line 409, and the pixel electrode 420*a* (the first terminal 220*b* of the first capacitor SC1 and the first terminal 220*a* of the second capacitor SC2) holds the first voltage. In the J+1$^{st}$ frame, the selection signal SG (n) is at a high-level during time T1 and the selection signal SG (n) has a signal with a pulse width of time T1. The pulse width of the time T1 is the first pulse width.

Next, a driving method in the J+2$^{nd}$ frame will be described. As shown in FIG. 5, in step 33 (S33), in the J+2$^{nd}$ frame, the first voltage is input to the pixel at the second pulse width (pulse width of time T2). As shown in FIG. 6 and FIG. 9, in the first holding period (Th1) of the J+2$^{nd}$ frame, a low level is supplied to the selection signal SG (n), the video signal SL (m) supplied with the first voltage is supplied to the video signal line 409, and the voltage of the pixel electrode 420*a* of the pixel 109 of the n-th row and m-th column holds the first voltage. The first selecting transistor Mssta and the second selecting transistor Msstb remain in the non-conductive state.

Figure 10:
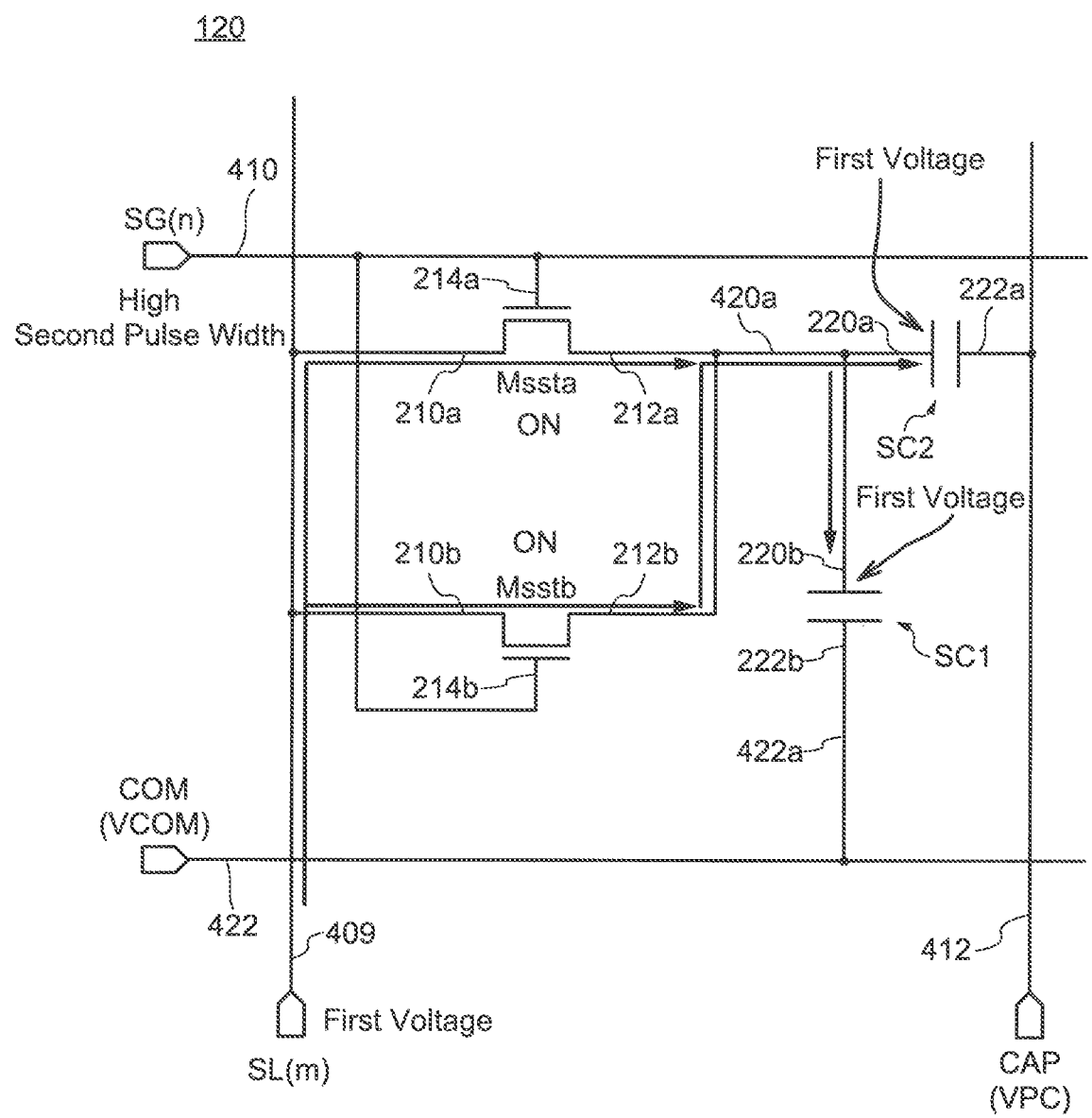
FIG. 10 is a schematic diagram showing an operation status of a pixel in the timing chart shown in FIG. 6.

Subsequently, as shown in FIG. 6 and FIG. 10, in the writing period of the J+2$^{nd}$ frame (Tw), at time t2, the selection signal SG (n) is changed from a low level to a high level and the high level is supplied to the selection signal SG (n). The video signal line 409 continues to be supplied with the first voltage. When the high level is supplied to the selection signal SG (n), the first selecting transistor signal Mssta and the second selecting transistor signal Msstb change from the non-conductive state to the conductive state, and the first voltage is supplied from the video signal line 409 to the pixel electrode 420*a* (the first terminal 220*b* of the first capacitor SC1 and the first terminal 220*a* of the second capacitor SC2) of the pixel 109 of the n-th row and m-th column.

As shown in FIG. 6 and FIG. 9, at time t2+T2 when time T2 has elapsed, the selection signal SG (n) changes from a high level to a low level. The low level is supplied to the selection signal SG (n). The first voltage is still supplied to the video signal line 409. When the low level is supplied to the selection signal SG (n), the first selecting transistor signal Mssta and the second selecting transistor signal Msstb change from the conductive state to the non-conductive state, and the supply of the first voltage from the video signal line 409 to the pixel electrode 420*a* (the first terminal 220*b* of the first capacitor SC1 and the first terminal 220*a* of the second capacitor SC2) of the pixel 109 of the n-th row and m-th column is stopped. Since the pixel 109 includes the first capacitor SC1 and the second capacitor SC2, the pixel electrode 420*a* (the first terminal 220*b* of the first capacitor SC1 and the first terminal 220a of the second capacitor SC2) continues to hold the first voltage.

Subsequently, as shown in FIG. 6 and FIG. 9, in the second holding period (Th2) of the J+2nd frame, from the time t2+T2 until the end of the J+2nd frame, a low level is supplied to the selection signal SG (n), the video signal SL (m) supplied with the first voltage is supplied to the video signal line 409, and the pixel electrode 420a (the first terminal 220b of the first capacitor SC1 and the first terminal 220a of the second capacitor SC2) holds the first voltage. In the J+2nd frame, the selection signal SG (n) is at a high-level during time T2, and the selection signal SG (n) has a signal with a pulse width of time T2. The pulse width of the time T2 is the second pulse width.

Next, a driving method in the J+3rd frame will be described. The driving method in the J+3rd frame is the same as the driving method in the J+2nd frame. The driving method in the J+3rd frame is a driving method in which the time t2 is replaced with the time t3 in the driving method of the J+2nd frame. Since the other driving methods are the same as the driving method of the J+2nd frame, the description thereof is omitted here. In the J+3rd frame, similar to the J+2nd frame, the selection signal SG (n) is at a high level during the time T2, and the selection signal SG (n) has a signal with a pulse width of the time T2. The pulse width of the time T2 is the second pulse width.

Since the driving methods in each of the J+4th frame to K−1st frame following the J+3rd frame is the same as the driving method in the J+3rd frame, the description thereof is omitted here. In each of the frames from the J+4th frame to the K−1st frame, similar to the J+3rd frame, the selection signal SG (n) is at a high level during the time T2, and the selection signal SG (n) has a signal with a pulse width of the time T2. The pulse width of the time T2 is the second pulse width.

Next, a driving method in the K-th frame will be described. As shown in FIG. 5, in step 35 (S35), in the K-th frame, the second voltage is input to the pixel at the first pulse width (pulse width of time T1). As shown in FIG. 6 and FIG. 9, in the first holding period (Th1) of the K-th frame, the low level is supplied to the selection signal SG (n) after the second holding period (Th2) of the K−1st frame, the video signal SL (m) supplied with the first voltage is supplied to the video signal line 409, and the pixel electrode 420a of the pixel 109 of the n-th row and m-th column holds the first voltage. Therefore, the first selecting transistor Mssta and the second selecting transistor Msstb remain in the non-conductive state.

Figure 11:
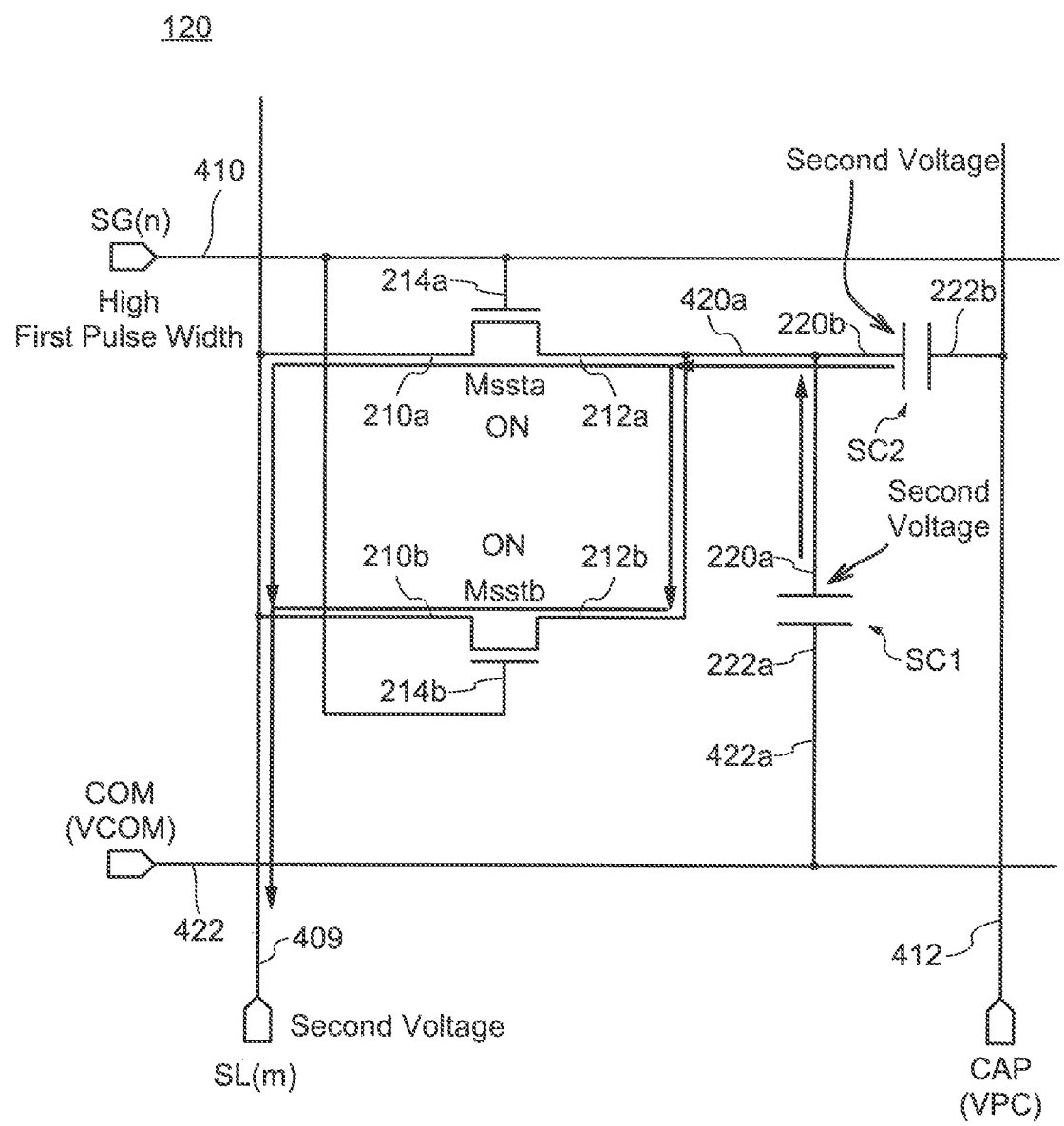
FIG. 11 is a schematic diagram showing an operation status of a pixel in the timing chart shown in FIG. 6.

Subsequently, as shown in FIG. 6 and FIG. 11, in the writing period of the K-th frame (Tw), at time t4, the selection signal SG (n) is changed from a low level to a high level and the high level is supplied to the selection signal SG (n). The video signal line 409 changes from the first voltage to the second voltage and the second voltage is supplied to the video signal line 409. When the high level is supplied to the selection signal SG (n), the first selecting transistor signal Mssta and the second selecting transistor signal Msstb change from the non-conductive state to the conductive state, and the second voltage is supplied from the video signal line 409 to the pixel electrode 420a (the first terminal 220b of the first capacitor SC1 and the first terminal 220a of the second capacitor SC2) of the pixel 109 of the n-th row and m-th column.

As shown in FIG. 6 and FIG. 11, when the time T1 has elapsed, that is, at time t4+T1, the selection signal SG (n) changes from a high level to a low level. The low level is supplied to the selection signal SG (n). The second voltage is still supplied to the video signal line 409. When the low level is supplied to the selection signal SG (n), the first selecting transistor signal Mssta and the second selecting transistor signal Msstb change from the conductive state to the non-conductive state, and the supply of the second voltage from the video signal line 409 to the pixel electrode 420a (the first terminal 220b of the first capacitor SC1 and the first terminal 220a of the second capacitor SC2) of the pixel 109 of the n-th row and m-th column is stopped. Since the pixel 109 includes the first capacitor SC1 and the second capacitor SC2, the pixel electrode 420a can hold the second voltage.

Subsequently, in the second holding period (Th2) of the K-th frame, from the time t4+T1 until the end of the K-th frame, the low level is supplied to the selection signal SG (n), the video signal SL (m) supplied with the second voltage is supplied to the video signal line 409, and the pixel electrode 420a holds the second voltage. In the K-th frame, the selection signal SG (n) is at a high-level during time T1 and the selection signal SG (n) has a signal with a pulse width of time T1. The pulse width of the time T1 is the first pulse width.

Next, as shown in FIG. 5, in step 37 (S37), in each frame of the L−1st frame from the K+1st frame, the second voltage is input to the pixel at the second pulse width (pulse width of time T2). The driving method of each of the K+1st frame to L−1st frame following the K-th frame is the same as the driving method in the L−2nd frame. The driving method in the L−2nd frame and the L−1st frame will be described, and the description of the other frames will be omitted. As shown in FIG. 6 and FIG. 9, in the first holding period (Th1) of the L−2nd frame, the low level is supplied to the selection signal SG (n), the video signal SL (m) supplied with the second voltage is supplied to the video signal line 409, and the voltage of the pixel electrode 420a of the pixel 109 of the n-th row and m-th column holds the second voltage. The first selecting transistor Mssta and the second selecting transistor Msstb remain in the non-conductive state.

Subsequently, as shown in FIG. 6 and FIG. 11, in the writing period of the L−2nd frame (Tw), at time t5, the selection signal SG (n) is changed from a low level to a high level and the high level is supplied to the selection signal SG (n). The video signal line 409 continues to be supplied with the second voltage. When the high level is supplied to the selection signal SG (n), the first selecting transistor signal Mssta and the second selecting transistor signal Msstb change from the non-conductive state to the conductive state, and the second voltage is supplied from the video signal line 409 to the pixel electrode 420a (the first terminal 220b of the first capacitor SC1 and the first terminal 220a of the second capacitor SC2) of the pixel 109 of the n-th row and m-th column.

Figure 12:
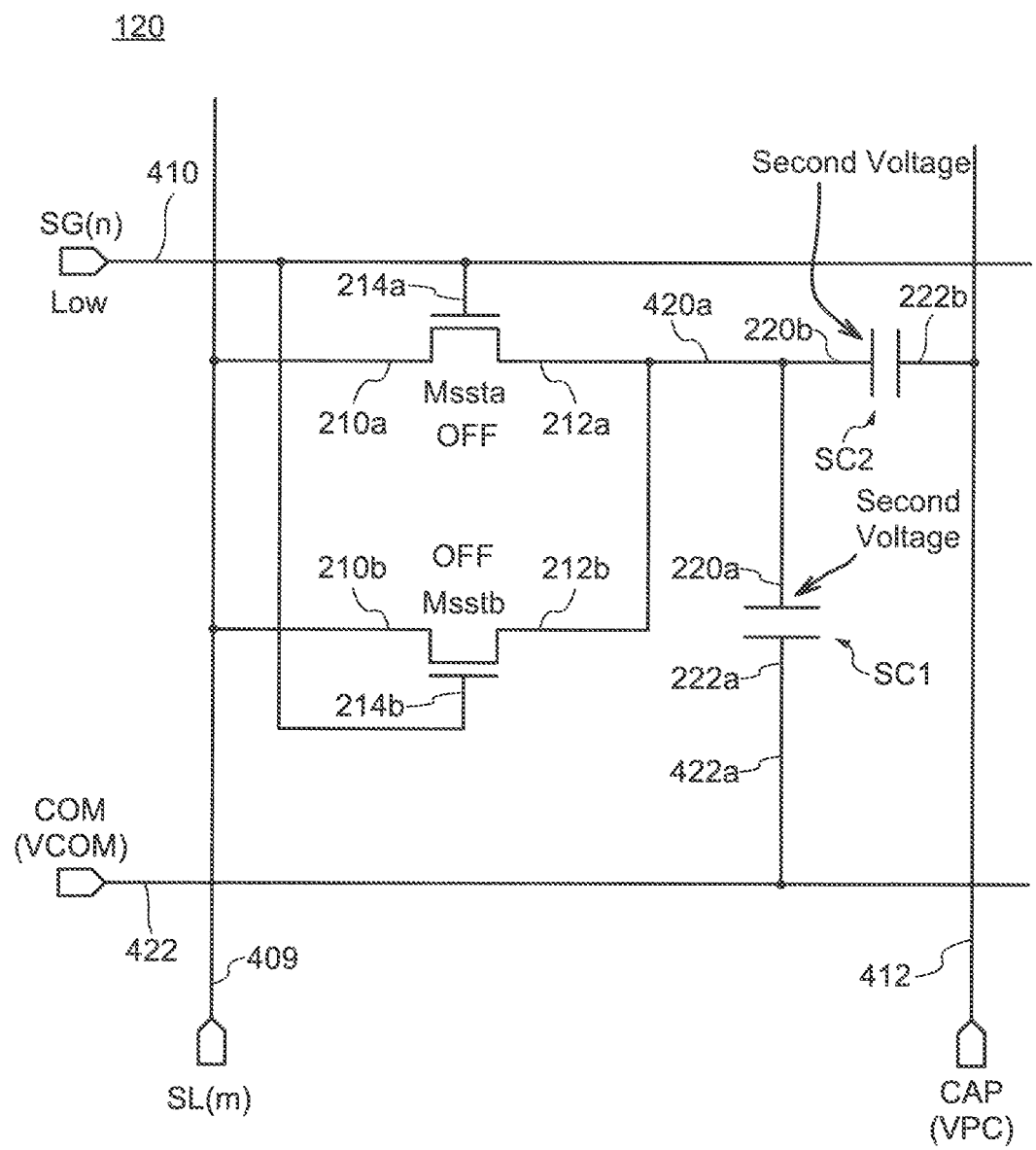
FIG. 12 is a schematic diagram showing an operation status of a pixel in the timing chart shown in FIG. 6.

As shown in FIG. 6 and FIG. 12, at time t5+T2 when the time T2 has elapsed, the selection signal SG (n) changes from a high level to a low level. The low level is supplied to the selection signal SG (n). The second voltage is still supplied to the video signal line 409. When the low level is supplied to the selection signal SG (n), the first selecting transistor signal Mssta and the second selecting transistor signal Msstb change from the conductive state to the non-conductive state, and the supply of the second voltage from the video signal line 409 to the pixel electrode 420a of the pixel 109 of the n-th row and m-th column is stopped. Since the pixel 109 includes the first capacitor SC1 and the second capacitor SC2, the pixel electrode 420a continues to hold the second voltage.

Subsequently, as shown in FIG. 6 and FIG. 12, in the second holding period (Th2) of the L−2nd frame, from the time t5+T2 until the end of the L−2nd frame, a low level is supplied to the selection signal SG (n), the video signal SL (m) supplied with the second voltage is supplied to the video signal line 409, and the pixel electrode 420a (the first terminal 220b of the first capacitor SC1 and the first terminal 220a of the second capacitor SC2) holds the second voltage. In L−2nd frame, the selection signal SG (n) is at a high-level during time T2 and the selection signal SG (n) has a signal with the pulse width of time T2. The pulse width of the time T2 is the second pulse width.

Next, a driving method in the L−1st frame will be described. The driving method in the L−1st frame is the same as the driving method in the L−2nd frame. The driving method in the L−1st frame is a driving method in which the time t5 is replaced with the time t6 in the driving method of the L−2nd frame. Since the other driving methods are the same as the driving method of the L−2nd frame, the description thereof is omitted here. In the L−1st frame, similar to the L−2nd frame, the selection signal SG (n) is at a high level during the time T2, and the selection signal SG (n) has a signal with a pulse width of the time T2. The pulse width of the time T2 is the second pulse width.

Next, a driving method in the L-th frame will be described. As shown in FIG. 5, in step 39 (S39), in the L-th frame, the second voltage is input to the pixel at the first pulse width (pulse width of time T1). The driving method in the L-th frame is the same as the driving method in the K-th frame. The driving method in the L-th frame is a driving method in which the time t4 is replaced with the time t7 in the driving method of the K-th frame. Since the other driving methods are the same as the driving method of the K-th frame, the description thereof is omitted here. In the L-th frame, similar to the K-th frame, the selection signal SG (n) is at a high level during the time T1, and the selection signal SG (n) has a signal with a pulse width of the time T1.

Figure 13:
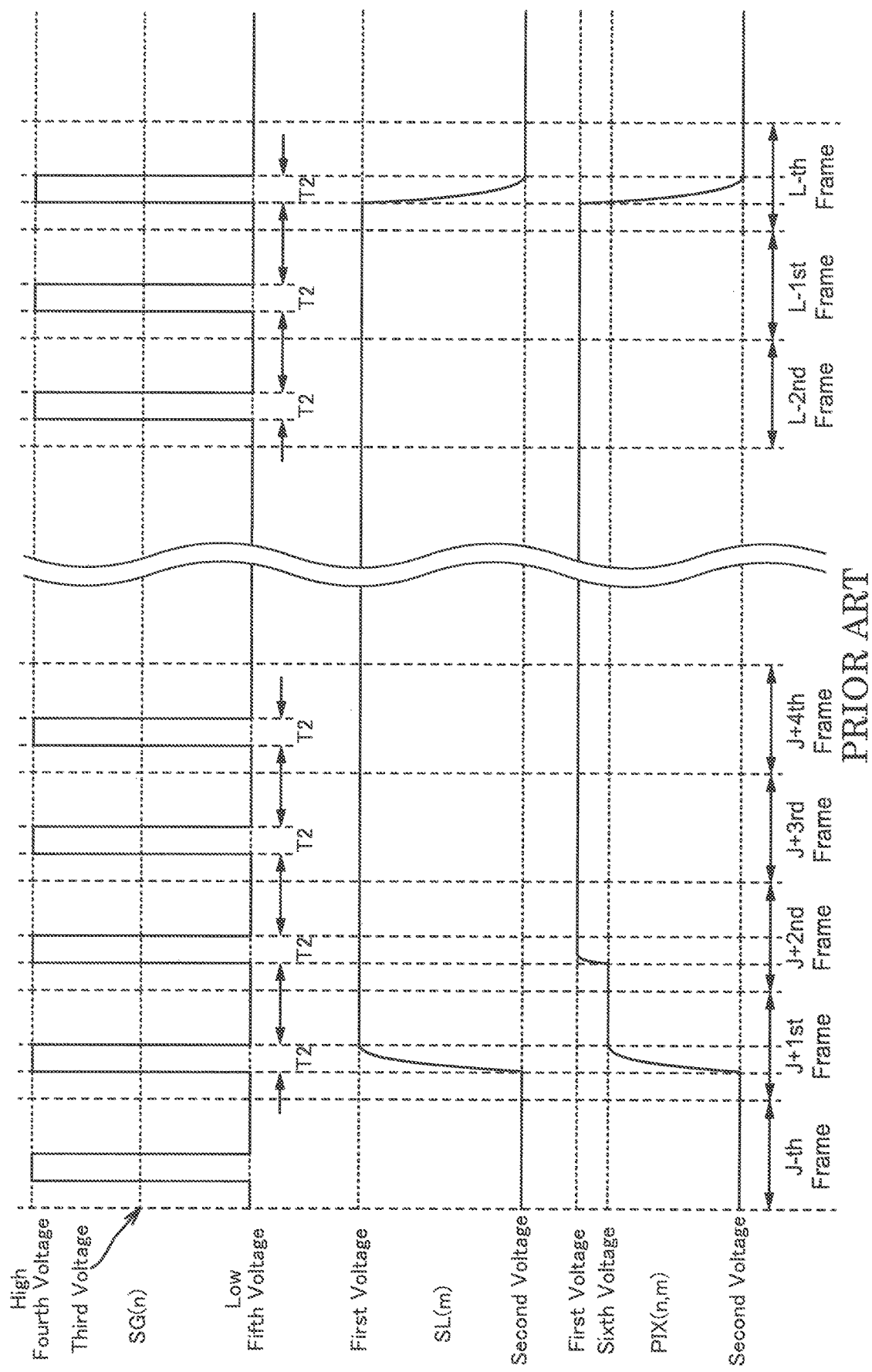
FIG. 13 is a timing chart showing a driving method of an electrophoresis display device according to a prior art.

FIG. 13 is a timing chart showing the driving method (of a second gradation) of the display device according to a prior art. In FIG. 13, in the display device according to the prior art, for example, in the J+1st frame to the L-th frame, the pulse width for writing the first voltage or the second voltage to the pixel 109 is the same. Specifically, the pulse width for writing the first voltage or the second voltage to the pixel 109 is the second pulse width which is narrower than the first pulse width. In this case, even if the first voltage is supplied to the pixel 109 from the video signal SL (m) to the pixel electrode 420a of the pixel 109 in the J+1st frame, the pulse width of the signal supplied to the selection signal SG (n) is narrow, and therefore, a sufficient voltage is not supplied to the pixel electrode 420a of the pixel 109 of the n-th row and m-th column. As a result, the voltage written to the pixel electrode 420a of the pixel 109 of the n-th row and m-th column is a sixth voltage which is smaller than the first voltage. In the following J+2nd frame, the voltage written to the pixel electrode 420a of the pixel 109 changes from the sixth voltage to the first voltage. In the case where the transistor characteristics of the first selecting transistor Mssta or the second selecting transistor Msstb are different for each pixel 109, the pixel electrode 420a of the first pixel 109a may be supplied with the first voltage and the pixel electrode 420a of the second pixel 109b may be supplied with the sixth voltage which is smaller than the first voltage as described above. When the voltages written to the pixel electrode 420a of the respective pixels 109 are different even though the same voltage is supplied to the respective pixels 109, the display device 100 displays images of different gradations for the respective pixels 109, and the difference in the gradation causes display unevenness.

On the other hand, when displaying the first gradation, the display device 100 writes the first voltage to the pixel 109 in the K−1st frame from the J+1st frame and writes the second voltage to the pixel 109 in the L-th frame from the K-th frame. The first pulse width of the J+1st frame writing the first voltage to the pixel 109 is the same as the first pulse width of the K-th frame writing the second voltage which is smaller than the first voltage to the pixel 109. In some cases, the polarity of the first voltage is inverted, and the first voltage is smaller than the second voltage. The second pulse width in each of the K−1st frame from the J+2nd frame writing the first voltage to the pixel 109 is narrower than the first pulse width. That is, when displaying the first gradation, the pulse width of the selection signal SG (n) of the first frame (J+1st frame) is set to the first pulse width that is the same or substantially the same as the pulse width of the selection signal SG (n) in the last frame (K-th frame). The pulse widths of the selection signal SG (n) in the second frame to the frame immediately before the second frame to the last frame (K−1st frame) are set to the same or substantially the same second pulse width. The second pulse width is set to be narrower than the first pulse width. In the J+1st frame, when the first voltage is supplied from the video signal SL (m) to the pixel 109 in the pixel electrode 420a of the pixel 109, the pulse width of the signal supplied to the selection signal SG (n) is wide so that the first voltage can be sufficiently written in the pixel electrode 420a of the pixel 109 of the n-th row and m-th column. As a result, even when the transistor characteristics of the first selecting transistor Mssta or the second selecting transistor Msstb are different for each pixel 109, the voltage to be written to the pixel electrode 420a of each pixel 109 can be a desired voltage corresponding to each pixel 109. Therefore, the display device 100 can display images having a desired gradation for pixel 109. Therefore, by using the driving method of the display device 100, it is possible to suppress the deterioration of the display quality of the electrophoresis display device.

As described above, the display device 100 can supply the voltages corresponding to each of the plurality of pixels 109 at a time obtained by adding together the first pulse width in the J+1st frame, the second pulse width in the J+2nd frame, and the second pulse width of each of the J+3rd to K−1st frames (a plurality of periods) equivalent to the J+2nd frame (a second frame) and changing the gradation to be displayed by each of the plurality of pixels 109.

In an embodiment of the present invention, the polarity of the first voltage may change. In an embodiment of the present invention, the common voltage VCOM and the constant voltage VPC may be referred to as the second voltage, the voltage at the high level may be referred to as a fourth voltage, and the voltage at the low level may be referred to as a fifth voltage. In an embodiment of the present invention, for example, the first voltage is +15 V, the second voltage is a ground GND which is smaller than the first voltage, the third voltage is a voltage between the fourth voltage and the fifth voltage (intermediate voltage or substantially intermediate voltage), the fourth voltage is +18 V, and the fifth voltage is −18 V. For example, the first voltage is −15 V, and the second voltage is ground GND which is greater than the first voltage. The ground GND is, for example, 0 V.

<1-5. Driving Method of Display Device 100>

Figure 14:
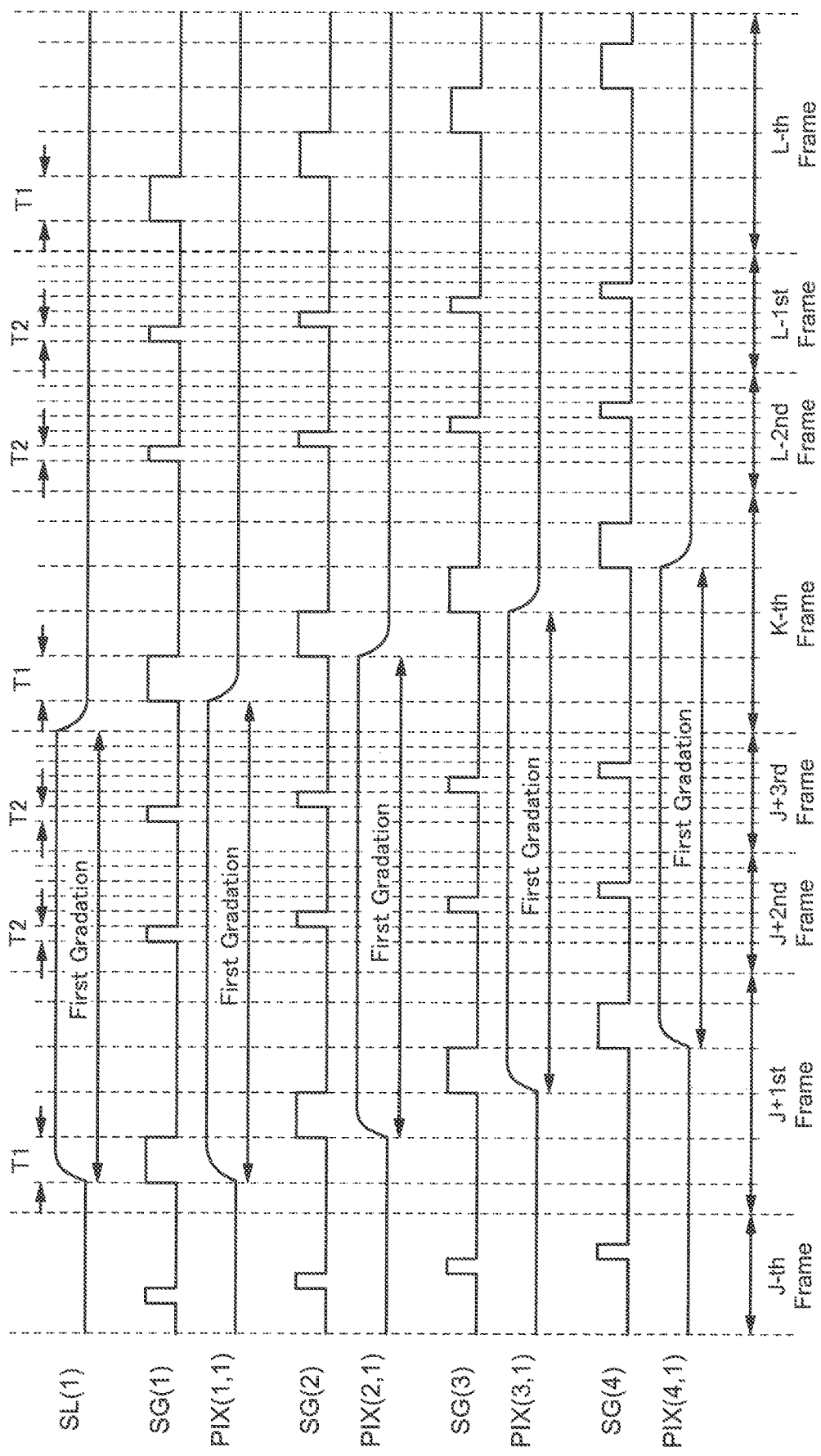
FIG. 14 is a timing chart showing a driving method of an electrophoresis display device according to an embodiment of the present invention.

FIG. 14 is a timing chart showing a driving method of the display device 100. The driving method shown in FIG. 14 is an example of the driving method of the display device 100, and the driving method of the display device 100 is not limited to the driving method shown in FIG. 14. The same or similar configurations as those of FIG. 1 to FIG. 13 will not be described here.

FIG. 14 shows the driving method of each pixel 109 of 4 rows and 1 column (n=4, m=1). FIG. 14 contains a J-th frame, J+1st frame, J+2nd frame, J+3rd frame, K-th frame, L−2nd frame, L−1st frame, and L-th frame. Each frame includes the first holding period (Th1), the writing period (Tw), and the second holding period (Th2) shown in FIG. 6. The numerical value J, the numerical value K, and the numerical value L are positive natural numbers, respectively, the numerical value L is larger than the numerical value K, and the numerical value K is larger than the numerical value J. In the driving method of the display device 100 according to an embodiment of the present invention, for example, the numerical value J is 1, the numerical value K is 5, and the numerical value L is 8. The J-th frame is the first frame, the J+1st frame is the second frame, and the J+2nd frame is the third frame. The J+3rd frame is the fourth frame, the K-th frame is the fifth frame, the L−2nd frame is the sixth frame, the L−1st frame is the seventh frame, and the L-th frame is the eighth frame. Since the driving method in each frame has been described with reference to FIG. 5 to FIG. 13, the description thereof is omitted here.

As shown in FIG. 14, in the pixel 109 of 1 row and 1 column, in the J+1st frame, the signal with the first pulse width is supplied to the selection signal SG (1), in the J+2nd frame, the signal with the second pulse width is supplied to the selection signal SG (1), and in the J+3rd frame, the signal with the second pulse width is supplied to the selection signal SG (1). In the pixel 109 of 1 row and 1 column, in the K-th frame, the signal with the first pulse width is supplied to the selection signal SG (1), in the L−2nd frame, the signal with the second pulse width is supplied to the selection signal SG (1), in the L−1st frame, the signal with the second pulse width is supplied to the selection signal SG (1), and in the L-th frame, the signal with the first pulse width is supplied to the selection signal SG (1). In the pixel 109 of 1 row and 1 column, the signal of the first voltage is supplied to the video signal SL (1) from the J+1st frame to the J+3rd frame, and the signal of the second voltage is supplied to the video signal SL (1) from the K-th frame to the L-th frame. As a result, in the pixel electrode 420a of the pixel 109 of 1 row and 1 column (PIX (1, 1)), from the J+1st frame to the J+3rd frame, the signal of the first voltage is written according to the selection signal SG (1) and the first voltage is held. IN the pixel electrode 420a of the pixel 109 of 1 row and 1 column (PIX (1, 1)), from the K-th frame to the L-th frame, the second voltage is written according to the selection signal SG (1) and the second voltage is held.

As described above, when the pixel 109 of 1 row and 1 column displays the first gradation, the pulse width of the selection signal SG (n) in the second frame (J+1st frame) is set to the first pulse width that is the same or substantially the same as the pulse width of the selection signal SG (n) in the fifth frame (K-th frame). The pulse widths of the selection signal SG (n) in the third frame (J+2nd frame), the fourth frame (J+3rd frame), the sixth frame (L−2nd frame), and the seventh frame (L−1st frame) are set to the same or substantially the same second pulse width. Further, the pulse width of the selection signal SG (n) in the eighth frame (L-th frame) is set to the first pulse width that is the same as or substantially the same as the selection signal SG (n) in the second frame (J+1st frame) and the fifth frame (K-th frame). As a result, the pixel 109 of 1 row and 1 column can display the first gradation.

As shown in FIG. 14, the selection signal SG (2) and the video signal SL (1) are supplied to the pixel 109 of 2 rows and 1 column. In J-th frame, J+2nd frame, J+3rd frame, L−2nd frame, and L−1st frame, the selection signal SG (2) is a signal supplied to the selection signal SG (1) is shifted by time T2. In the J+1st frame, the K-th frame, and the L-th frame, the selection signal SG (2) is a signal supplied to the selection signal SG (1) shifted by time T1. The video signal SL (1) supplied to the pixel 109 of 2 rows and 1 column is the same signal as the video signal SL (1) supplied to the pixel 109 of 1 row and 1 column. As a result, in the pixel electrode 420a of the pixel 109 of 2 rows and 1 column (PIX (2, 1)), from the J+1st frame to the J+3rd frame, the signal of the first voltage is written according to the selection signal SG (2) and the first voltage is held. In the pixel electrode 420a of the pixel 109 of 2 rows and 1 column (PIX (2, 1)), from the K-th frame to the L-th frame, the second voltage is written according to the selection signal SG (2), and the second voltage is held. Therefore, the pixel 109 of 2 rows and 1 column can display the first gradation.

As shown in FIG. 14, the selection signal SG (3) and the video signal SL (1) are supplied to the pixel 109 of 3 rows and 1 column. In J-th frame, J+2nd frame, J+3rd frame, L−2nd frame, and L−1st frame, the selection signal SG (3) is a signal supplied to the selection signal SG (2) shifted by time T2. In J+1st frame, K-th frame, and L-th frame, the selection signal SG (3) is the signal supplied to the selection signal SG (2) shifted by time T1. The video signal SL (1) supplied to the pixel 109 of 3 rows and 1 column is the same signal as the video signal SL (1) supplied to the pixel 109 of 1 row and 1 column. As a result, in the pixel electrode 420a of the pixel 109 of 3 rows and 1 column (PIX (3, 1)), from the J+1st frame to the J+3rd frame, the signal of the first voltage is written according to the selection signal SG (3) and the first voltage is held. In the pixel electrode 420a of the pixel 109 of 3 rows and 1 column (PIX (3, 1)), from the K-th frame to the L-th frame, the second voltage is written according to the selection signal SG (3) and the second voltage is held. Therefore, the pixel 109 of 3 rows and 1 column can display the first gradation.

As shown in FIG. 14, the selection signal SG (4) and the video signal SL (1) are supplied to the pixel 109 of 4 rows and 1 column. In J-th frame, J+2nd frame, J+3rd frame, L−2nd frame, and L−1st frame, the selection signal SG (4) is a signal supplied to the selection signal SG (2) shifted by time T2. In J+1st frame, K-th frame, and L-th frame, the selection signal SG (4) is a signal supplied to the selection signal SG (2) shifted by time T1. The video signal SL (1) supplied to the pixel 109 of 4 rows and 1 column is the same signal as the video signal SL (1) supplied to the pixel 109 of 1 row and 1 column. As a result, in the pixel electrode 420a of the pixel 109 of 4 rows and 1 column (PIX (3, 1)), from the J+1st frame to the J+3rd frame, the signal of the first voltage is written according to the selection signal SG (4) and the first voltage is held. In the pixel electrode 420a of the pixel 109 of 4 rows and 1 column (PIX (3, 1)), from the K-th frame to the L-th frame, the second voltage is written according to the selection signal SG (4) and the second voltage is held. Therefore, the pixel 109 of 4 rows and 1 column can display the first gradation.

As described above, even when the first gradation is displayed, by using the driving method of the display device

100, display unevenness of the electrophoresis display device can be suppressed, and deterioration of the display quality can be suppressed.

<1-6. Driving Method of Display Device 100>

Figure 15:
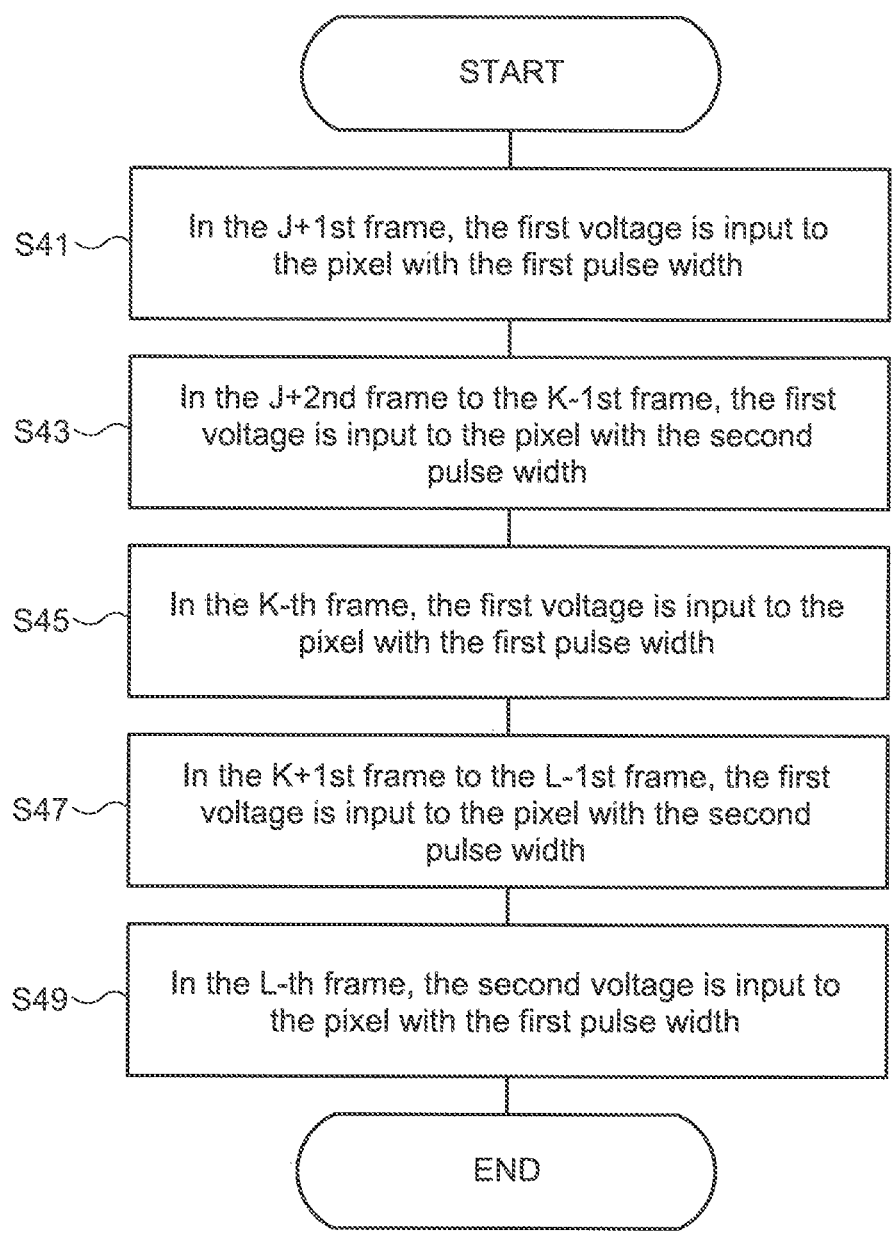
FIG. 15 is a flowchart showing a driving method of an electrophoresis display device according to an embodiment of the present invention.
Figure 16:
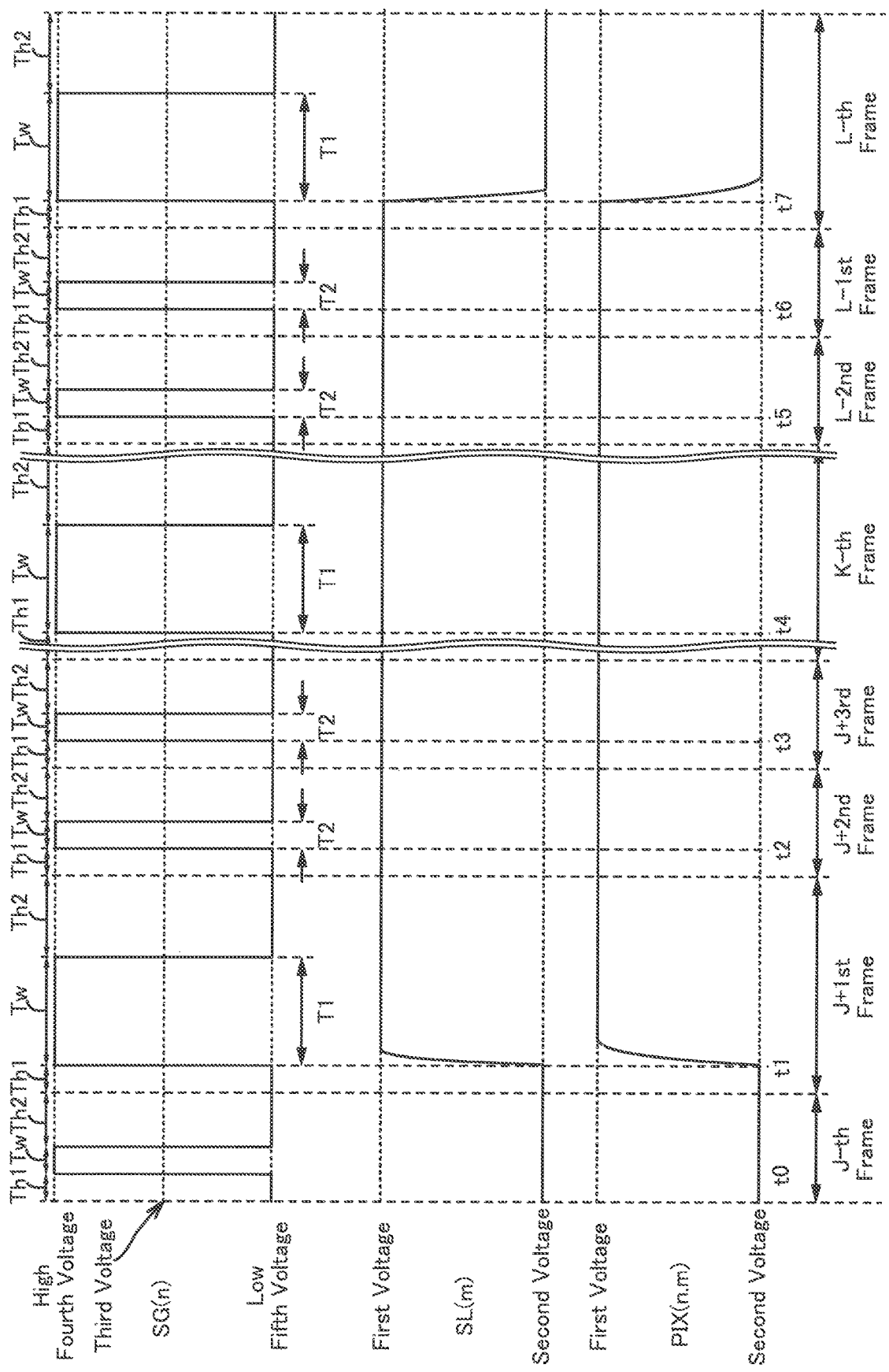
FIG. 16 is a timing chart showing a driving method of an electrophoresis display device according to an embodiment of the present invention.

FIG. 15 is a flowchart showing a driving method of the display device 100. FIG. 16 and FIG. 17 are timing charts showing the driving method of the display device 100. The driving method shown in FIG. 15 to FIG. 17 is an example of the driving method of the display device 100, and the driving method of the display device 100 is not limited to the driving method shown in FIG. 15 to FIG. 17. The same or similar configurations as those of FIG. 1 to FIG. 14 will not be described here.

The driving method shown in FIG. 15 to FIG. 17 is a driving method for displaying the second gradation using the driving method of the display device 100.

Since the driving method of the J-th frame, J+1st frame, J+2nd frame, J+3rd frame, and J+4th frame to the K−1st frame is similar to the driving method described with reference to FIG. 5 to FIG. 12, the description thereof is omitted here.

Next, a driving method in the K-th frame will be described. As shown in step 45 (S45) of FIG. 15, in the K-th frame, the first voltage is input to the pixel at the first pulse width (pulse width of time T1). As shown in FIG. 16, in the first holding period (Th1) of the K-th frame, the low level is supplied to the selection signal SG (n) after the second holding period (Th2) of the K−1st frame, the video signal SL (m) supplied with the first voltage is supplied to the video signal line 409, and the pixel electrode 420*a* of the pixel 109 of the n-th row and m-th column holds the first voltage. Therefore, the first selecting transistor Mssta and the second selecting transistor Msstb remain in the non-conductive state.

Subsequently, as shown in FIG. 16, in the writing period of the K-th frame (Tw), at time t4, the selection signal SG (n) is changed from a low level to a high level and the high level is supplied to the selection signal SG (n). The video signal line 409 continues to be supplied with the first voltage, and the video signal line 409 is supplied with the first voltage. When the selection signal SG (n) is supplied with a high level, the first selecting transistor signal Mssta and the second selecting transistor signal Msstb change from the non-conductive state to the conductive state, and the first voltage is supplied from the video signal line 409 to the pixel electrode 420*a* (the first terminal 220*b* of the first capacitor SC1 and the first terminal 220*a* of the second capacitor SC2) of the pixel 109 of the n-th row and m-th column.

As shown in FIG. 16, at time t4+T1 when the time T1 has elapsed, the selection signal SG (n) changes from a high level to a low level. The low level is supplied to the selection signal SG (n). The first voltage is still supplied to the video signal line 409. When the low level is supplied to the selection signal SG (n), the first selecting transistor signal Mssta and the second selecting transistor signal Msstb change from the conductive state to the non-conductive state, and the supply of the first voltage from the video signal line 409 to the pixel electrode 420*a* (the first terminal 220*b* of the first capacitor SC1 and the first terminal 220*a* of the second capacitor SC2) of the pixel 109 of the n-th row and m-th column is stopped. Since the pixel 109 includes the first capacitor SC1 and the second capacitor SC2, the pixel electrode 420*a* can hold the first voltage.

Subsequently, in the second holding period (Th2) of the K-th frame, from the time t4+T1 until the end of the K-th frame, a low level is supplied to the selection signal SG (n), the video signal SL (m) supplied with the first voltage is supplied to the video signal line 409, and the pixel electrode 420*a* holds the first voltage. In the K-th frame, the selection signal SG (n) is at a high-level during time T1 and the selection signal SG (n) has a signal with the pulse width of time T1. The pulse width of the time T1 is the first pulse width.

Next, as shown in step 47 (S47) of FIG. 15, in each frame from the K+1st frame to the L−1st frame, the first voltage is input to the pixel at the second pulse width (pulse width of time T2). The driving method in each of the K+1st frame to L−1st frame following the K-th frame is the same as the driving method in the L−2nd frame. The driving method in the L−2nd frame and the L−1st frame will be described, and the description of the other frames will be omitted. As shown in FIG. 16, in the first holding period (Th1) of the L−2nd frame, a low level is supplied to the selection signal SG (n), the video signal SL (m) supplied with the first voltage is supplied to the video signal line 409, and the voltage of the pixel electrode 420*a* of the pixel 109 of the n-th row and m-th column holds the first voltage. The first selecting transistor Mssta and the second selecting transistor Msstb remain in the non-conductive state.

Subsequently, as shown in FIG. 16, in the writing period of the L−2nd frame (Tw), at time t5, the selection signal SG (n) is changed from a low level to a high level and the high level is supplied to the selection signal SG (n). The video signal line 409 continues to be supplied with the first voltage. When the selection signal SG (n) is supplied with a high level, the first selecting transistor signal Mssta and the second selecting transistor signal Msstb change from the non-conductive state to the conductive state, and the first voltage is supplied from the video signal line 409 to the pixel electrode 420*a* (the first terminal 220*b* of the first capacitor SC1 and the first terminal 220*a* of the second capacitor SC2) of the pixel 109 of the n-th row and m-th column.

As shown in FIG. 16, at time t5+T2 when the time T2 has elapsed, the selection signal SG (n) changes from a high level to a low level. The low level is supplied to the selection signal SG (n). The first voltage is still supplied to the video signal line 409. When the low level is supplied to the selection signal SG (n), the first selecting transistor signal Mssta and the second selecting transistor signal Msstb change from the conductive state to the non-conductive state, and the supply of the first voltage from the video signal line 409 to the pixel electrode 420*a* of the pixel 109 of the n-th row and m-th column is stopped. Since the pixel 109 includes the first capacitor SC1 and the second capacitor SC2, the pixel electrode 420*a* continues to hold the first voltage.

Subsequently, as shown in FIG. 16, in the second holding period (Th2) of the L−2nd frame, from the time t5+T2 until the end of the L−2nd frame, a low level is supplied to the selection signal SG (n), the video signal SL (m) supplied with the first voltage is supplied to the video signal line 409, and the pixel electrode 420*a* (the first terminal 220*b* of the first capacitor SC1 and the first terminal 220*a* of the second capacitor SC2) holds the first voltage. In the L−2nd frame, the selection signal SG (n) is at a high-level during time T2, the selection signal SG (n) has a signal with the pulse width of time T2. The pulse width of the time T2 is the second pulse width.

Next, a driving method in the L−1st frame will be described. The driving method in the L−1st frame is the same as the driving method in the L−2nd frame. The driving method in the L−1st frame is a driving method in which the time t5 is replaced with the time t6 in the driving method of the L−2nd frame. Since the other driving methods are the same as the driving method of the L−2nd frame, the description thereof is omitted here. In the L−1st frame, similar to the L−2nd frame, the selection signal SG (n) is at a high level during the time T2, and the selection signal SG (n) has a signal with a pulse width of the time T2. The pulse width of the time T2 is the second pulse width.

Next, a driving method in the L-th frame will be described. As shown in step 49 (S49) of FIG. 15, in the L-th frame, the second voltage is input to the pixel at the first pulse width (pulse width of time T1). As shown in FIG. 16, in the first holding period (Th1) of the L-th frame, the low level is supplied to the selection signal SG (n) after the second holding period (Th2) of the L−1st frame, the video signal SL (m) supplied with the first voltage is supplied to the video signal line 409, and the pixel electrode 420a of the pixel 109 of the n-th row and m-th column holds the first voltage. Therefore, the first selecting transistor Mssta and the second selecting transistor Msstb remain in the non-conductive state.

Subsequently, as shown in FIG. 16, in the writing period of the L-th frame (Tw), at time t7, the selection signal SG (n) is changed from a low level to a high level and the high level is supplied to the selection signal SG (n). The video signal line 409 changes from the first voltage to the second voltage and the second voltage is supplied to the video signal line 409. When the high level is supplied to the selection signal SG (n), the first selecting transistor signal Mssta and the second selecting transistor signal Msstb change from the non-conductive state to the conductive state, and the second voltage is supplied from the video signal line 409 to the pixel electrode 420a (the first terminal 220b of the first capacitor SC1 and the first terminal 220a of the second capacitor SC2) of the pixel 109 of the n-th row and m-th column.

As shown in FIG. 16, at time t7+T1 when the time T1 has elapsed, the selection signal SG (n) changes from a high level to a low level. The low level is supplied to the selection signal SG (n). The second voltage is still supplied to the video signal line 409. When the low level is supplied to the selection signal SG (n), the first selecting transistor signal Mssta and the second selecting transistor signal Msstb change from the conductive state to the non-conductive state, and the supply of the second voltage from the video signal line 409 to the pixel electrode 420a (the first terminal 220b of the first capacitor SC1 and the first terminal 220a of the second capacitor SC2) of the pixel 109 of the n-th row and m-th column is stopped. Since the pixel 109 includes the first capacitor SC1 and the second capacitor SC2, the pixel electrode 420a can hold the second voltage.

Subsequently, in the second holding period (Th2) of the L-th frame, from the time t7+T1 until the end of the K-th frame, the low level is supplied to the selection signal SG (n), the video signal SL (m) supplied with the second voltage is supplied to the video signal line 409, and the pixel electrode 420a holds the second voltage. In the L-th frame, the selection signal SG (n) is at a high-level during time T1 and the selection signal SG (n) has a signal with a pulse width of time T1. The pulse width of the time T1 is the first pulse width.

When displaying the second gradation, the display device writes the first voltage to the pixel 109 in the L−1st frame from the J+1st frame and writes the second voltage to the pixel 109 in the L-th frame. The first pulse width of the J+1st frame writing the first voltage to the pixel 109 is the same as the first pulse width of the L-th frame writing the second voltage which is smaller than the first voltage to the pixel 109. In some cases, the polarity of the first voltage is inverted, and the first voltage is smaller than the second voltage. The second pulse widths of each of the J+2nd frame to the K−1st frame and the L−1st frame to the K+1st frame writing the first voltage to the pixel 109 are narrower than the first pulse width. Furthermore, the first pulse width of the K-th frame writing the first voltage to the pixel 109 is the same as the first pulse width of the J+1st frame and the first pulse width of the L-th frame. That is, when displaying the second gradation, the pulse width of the selection signal SG (n) of the first frame (J+1st frame) is set to the first pulse width that is the same or substantially the same as the pulse width of the selection signal SG (n) of the last frame (L-th frame). The pulse widths of the selection signal SG (n) of the second frame to the K−1st frame and the K+1st frame to the L−1st frame are set to the same or substantially the same second pulse width. The second pulse width is narrower than the first pulse width. In the display device 100, when the first voltage is supplied from the video signal SL (m) to the pixel electrode 420a of the pixel 109 in the J+1st frame, the pulse width of the signal supplied to the selection signal SG (n) is wide so that the first voltage can be sufficiently written in the pixel electrode 420a of the pixel 109 of the n-th row and m-th column. As a result, even when the transistor characteristics of the first selecting transistor Mssta or the second selecting transistor Msstb are different for each pixel 109, the voltage to be written to the pixel electrode 420a of each pixel 109 can be a desired voltage corresponding to each pixel 109. Therefore, the display device 100 can display images having a desired gradation for a pixel 109. Therefore, by using the driving method of the display device 100, it is possible to suppress the deterioration of the display quality of the electrophoresis display device.

The pulse width of the selection signal SG (n) of the first frame (J+1st frame) is set to the same or substantially the same first pulse width as the pulse width of the selection signal SG (n) of the K-th frame and the pulse width of the selection signal SG (n) of the L-th frame, the pulse widths of the second frame to the K−1st frame and the K+1st frame to the L−1st frame are set to the same or substantially the same second pulse width, and the second pulse width is narrower than the first pulse width. As a result, the total time of the pulse width of the selection signal SG (n) supplied to the pixel 109 can be made uniform for each column of the pixel 109. Therefore, by using the driving method of the display device 100, the display unevenness of the electrophoresis display device can be suppressed, and the deterioration of the display quality can be suppressed.

As described above, the display device 100 can supply the voltages corresponding to each of the plurality of pixels 109 at a time obtained by adding together the first pulse width in the J+1st frame, the second pulse width in the J+2nd frame, the first pulse width in the K-th frame (a period equivalent to the J+1st frame (the first frame)), the second pulse width in the J+3 to K−1st frames (a plurality of periods) equivalent to the J+2nd frame (the second frame), and the third pulse width in the L-th frame and change the gradation to be displayed by each of the plurality of pixels 109.

<1-7. Driving Method of Display Device 100>

FIG. 17 is a timing chart showing a driving method of the display device 100. The driving method shown in FIG. 17 is an example of a driving method of the display device 100, and the driving method of the display device 100 is not limited to the driving method shown in FIG. 17. The same or similar configurations as those of FIG. 1 to FIG. 16 will not be described here.

FIG. 17 is a diagram for explaining a display of the second gradation as compared with FIG. 14 for explaining the display of the first gradation. The other points are the same as those in FIG. 14, and a description thereof will be omitted.

As shown in FIG. 17, in the pixel 109 of 1 row and 1 column, the signal of the first pulse width is supplied to the selection signal SG (1) in the J+1st frame, the signal of the second pulse width is supplied to the selection signal SG (1) in the J+2nd frame, and the signal of the second pulse width is supplied to the selection signal SG (1) in the J+3rd frame. In the pixel 109 of 1 row and 1 column, the signal of the first pulse width is supplied to the selection signal SG (1) in the Kth frame, the signal of the second pulse width is supplied to the selection signal SG (1) in the L-second frame, the signal of the second pulse width is supplied to the selection signal SG (1) in the L−1st frame, and the signal of the first pulse width is supplied to the selection signal SG (1) in the L-th frame. In the pixel 109 of 1 row and 1 column, the signal of the first voltage is supplied to the video signal SL (1) from the J+1st frame to the L−1st frame, and the signal of the second voltage is supplied to the video signal SL (1) in the L-th frame. As a result, in the pixel electrode 420a of the pixel 109 of 1 row and 1 column (PIX (1, 1)), from the J+1st frame to the L−1st frame, the signal of the first voltage is written according to the selection signal SG (1) and the first voltage is held, and in the L-th frame, the second voltage is written according to the selection signal SG (1) and the second voltage is held.

As described above, when the pixel 109 of 1 row and 1 column displays the second gradation, the pulse width of the selection signal SG (n) of the second frame (J+1st frame) is set to the same or substantially the same first pulse width as the pulse width of the selection signal SG (n) of the fifth frame (K-th frame) and the pulse width of the selection signal SG (n) of the eighth frame (L-th frame). The pulse widths of the selection signal SG (n) in the third frame (J+2nd frame), the fourth frame (J+3rd frame), the sixth frame (L−2nd frame), and the seventh frame (L−1st frame) are set to the same or substantially the same second pulse width. As a result, the pixel 109 of 1 row and 1 column can display the second gradation.

As shown in FIG. 17, the selection signal SG (2) and the video signal SL (1) are supplied to the pixel 109 of 2 rows and 1 column. In the J-th frame, J+2nd frame, J+3rd frame, L−2nd frame, and L−1st frame, the selection signal SG (2) is a signal supplied to the selection signal SG (1) shifted by time T2. In the J+1st frame, the K-th frame, and the L-th frame, the selection signal SG (2) is a signal t supplied to the selection signal SG (1) shifted by time T1. The video signal SL (1) supplied to the pixel 109 of 2 rows and 1 column is the same signal as the video signal SL supplied to the pixel 109 of 1 row and 1 column. As a result, in the pixel electrode 420a of the pixel 109 of 2 rows and 1 column (PIX (2, 1)), from the J-th frame to the L−1st frame, the signal of the first voltage is written according to the selection signal SG (2) and the first voltage is held. In the pixel electrode 420a of the pixel 109 of 2 rows and 1 column (PIX (2, 1)), in the L-th frame, the second voltage is written according to the selection signal SG (2) and holds the second voltage. Therefore, the pixel 109 of 2 rows and 1 column can display the second gradation.

As shown in FIG. 17, the selection signal SG (3) and the video signal SL (1) are supplied to the pixel 109 of 3 rows and 1 column. In the J-th frame, J+2nd frame, J+3rd frame, L−2nd frame, and L−1st frame, the selection signal SG (3) is a signal supplied to the selection signal SG (2) shifted by time T2. In the J+1st frame, the K-th frame, and the L-th frame, the selection signal SG (3) is a signal supplied to the selection signal SG (2) shifted by time T1. The video signal SL (1) supplied to the pixel 109 of 3 rows and 1 column is the same signal as the video signal SL supplied to the pixel 109 of 1 row and 1 column. As a result, in the pixel electrode 420a of the pixel 109 of 3 rows and 1 column (PIX (3, 1)), from the J+1st frame to the L−1st frame, the signal of the first voltage is written according to the selection signal SG (3) and holds the first voltage. In the pixel electrode 420a of the pixel 109 of 3 rows and 1 column (PIX (3, 1)), the second voltage is written according to the selection signal SG (3) in the L-th frame and holds the second voltage. Therefore, the pixel 109 of 3 rows and 1 column can display the second gradation.

As shown in FIG. 17, the selection signal SG (4) and the video signal SL (1) are supplied to the pixel 109 of 4 rows and 1 column. In the J-th frame, the J+second frame, the J+third frame, the L−2nd frame, and the L−1st frame, the selection signal SG (4) is a signal supplied to the selection signal SG (3) shifted by time T2. In the J+1st frame, the K-th frame, and the L-th frame, the selection signal SG (4) is a signal supplied to the selection signal SG (3) shifted by time T1. The video signal SL (1) supplied to the pixel 109 of 4 rows and 1 column is the same signal as the video signal SL (1) supplied to the pixel 109 of 1 row and 1 column. As a result, in the pixel electrode 420a of the pixel 109 of 4 rows and 1 column (PIX (3, 1)), from the J-th frame to the L−1st frame, the signal of the first voltage is written according to the selection signal SG (4) and the first voltage is held. In the pixel electrode 420a of the pixel 109 of 4 rows and 1 column (PIX (3, 1)), in the L-th frame, the second voltage is written according to the selection signal SG (4) and holds the second voltage. Therefore, the pixel 109 of 4 rows and 1 column can display the second gradation.

As described above, even when the second gradation is displayed, by using the driving method of the display device 100, display unevenness of the electrophoresis display device can be suppressed, and deterioration of the display quality can be suppressed.

Each embodiment or a part of each embodiment described above as an embodiment of the present invention can be implemented in combination as appropriate as long as they do not contradict each other.

Other working effects which are different from the working effect brought about by the mode of each embodiment described above are naturally understood to be brought about by the present invention from what is clear from the description in this specification or what can be easily predicted by the person skilled in the art.

What is claimed is:
1. A driving method of a display device, the display device comprising at least one pixel having a first capacitive element having a first terminal and a transistor connected to the first terminal and having a second terminal and a gate electrode,
the method comprising:
in a first frame,
supplying a signal with a first pulse width to the gate electrode of the transistor; and
writing a first voltage from the second terminal to the first terminal;
in a second frame after the first frame,
supplying a signal with a second pulse width to the gate electrode; and
holding the first voltage in the first terminal;
in a third frame after the second frame,
suppling a signal with a third pulse width to the gate electrode; and writing a second voltage from the second terminal to the first terminal;

wherein
the second pulse width is narrower than the first pulse width,
the third pulse width is the same as the first pulse width, and
the second voltage is smaller than the first voltage.

2. The driving method of a display device according to claim 1, further comprising,
a plurality of periods equivalent to the second frame included between the second frame and the third frame.

3. The driving method of a display device according to claim 2, wherein
a gradation displayed on the pixel changes with a total time of the first pulse width, the second pulse width, and the second pulse width of each of the plurality of periods equivalent to the second frame.

4. The driving method of a display device according to claim 1, further comprising,
a period equivalent to the first frame and a period equivalent to the second frame included between the second frame and the third frame.

5. The driving method of a display device according to claim 4, wherein
a gradation displayed on the pixel changes with a total time of the first pulse width, the second pulse width, the second pulse width of the period equivalent to the first frame and the second pulse width of the period equivalent to the second frame.

6. The driving method of a display device according to claim 1, wherein
the display device has a plurality of pixels including the at least one pixel, and
each of the plurality of pixels executes the first frame, the second frame, and the third frame respectively.

7. The driving method of a display device according to claim 1, further comprising a first signal line and a second signal line, wherein
the second terminal is connected to the first signal line,
the gate electrode is connected to the second signal line,
the signal having the first pulse width, the signal having the second pulse width, and the signal having the third pulse width are supplied from the second signal line to the gate electrode,
the first voltage and the second voltage are supplied from the first signal line to the second terminal,
in the first frame, the transistor is turned on while the signal of the first pulse width is supplied from the second signal line to the gate electrode,
in the second frame, the transistor is turned on while the signal of the second pulse width is supplied from the second signal line to the gate electrode,
in the third frame, the transistor is turned on while the signal of the third pulse width is supplied from the second signal line to the gate electrode, and
a voltage of the first terminal drops from the first voltage to the second voltage.

8. The driving method of a display device according to claim 7, wherein
a threshold voltage of the transistor is smaller than the difference between the high level of the signal supplied to the second signal line and the first voltage.

9. A driving method of a display device comprising:
supplying a first voltage to a first terminal while a signal of a first pulse width is supplied in the first frame;
holding the first voltage in the first terminal while a signal having a second pulse width different from the signal having the first pulse width is supplied in the second frame after the first frame; and
supplying a second voltage to the first terminal while the first pulse width signal and a third pulse width signal different from the second pulse width signal are supplied in the third frame after the second frame;

wherein
the second pulse width is narrower than the first pulse width,
the third pulse width is the same as the first pulse width, and
the second voltage is smaller than the first voltage.

* * * * *